United States Patent
Bahrehmand

(10) Patent No.: US 9,699,836 B2
(45) Date of Patent: Jul. 4, 2017

(54) MULTIFUNCTIONAL UNIVERSAL LED DRIVER

(71) Applicant: Farhad Bahrehmand, Seven Hills, OH (US)

(72) Inventor: Farhad Bahrehmand, Seven Hills, OH (US)

( * ) Notice: Subject to any disclaimer, the term of this patent is extended or adjusted under 35 U.S.C. 154(b) by 0 days.

(21) Appl. No.: 14/120,691

(22) Filed: Jun. 18, 2014

(65) Prior Publication Data

US 2015/0373796 A1    Dec. 24, 2015

(51) Int. Cl.
*H05B 33/08* (2006.01)
*H05B 37/02* (2006.01)

(52) U.S. Cl.
CPC ..... *H05B 33/0815* (2013.01); *H05B 33/0803* (2013.01); *H05B 33/0848* (2013.01); *H05B 37/0227* (2013.01); *H05B 37/0272* (2013.01)

(58) Field of Classification Search
CPC combination set(s) only.
See application file for complete search history.

(56) References Cited

U.S. PATENT DOCUMENTS

| | | |
|---|---|---|
| 6,940,733 B2 | 9/2005 | Schie et al. |
| 7,145,295 B1 | 12/2006 | Lee |
| 8,169,387 B2 | 5/2012 | Mittal |
| 8,492,988 B2 | 7/2013 | Nuhfer |
| 2004/0212321 A1 | 10/2004 | Lys |
| 2006/0113975 A1 | 6/2006 | Mednik |

OTHER PUBLICATIONS

Supertex HV9910B LED Driver IC Data Sheet 2010.
Texas Instruments LMC555 Clock/Timing IC Data Sheet, Mar. 2013.
Molex 22-28-4024 Breakaway Header Data Sheet Apr. 3, 2014.
Texas Instruments MSP430F2112 Microcontroller Data Sheet Nov. 2007.
NXP Wireles Microcontroller JN516X Data Sheet V1.3 2013.
Texas Instruments C04066 Data Sheet Sep. 2003.
ST Microelectronics M41T6X Real-Time Clock Data Sheet Rev 20 2013
Elmos E931.97 PIR Controller IC Data Sheet Jul. 2011.
Perkin Elmer PIR Sensor Data Sheet.
Advanced Photonix PDV-P8103 Light Sensor Data Sheet Mar. 30, 2006.

*Primary Examiner* — Douglas W Owens
*Assistant Examiner* — Jianzi Chen

(57) ABSTRACT

A multifunctional universal LED driver is disclosed that can be configured to match the voltage and/or current requirements of various LED loads such as LED lighting fixtures. The disclosed LED driver replaces the existing wall switch to drive an LED lighting fixture with no need for making changes to the existing wires. The user control means are installed in the faceplate of the LED driver and are relatively accessible to an end user. The configuration control means are installed so as to be relatively inaccessible to an end user during normal operation of the LED driver. In a wireless embodiment, a wireless remote controller operates the LED driver. In another wireless embodiment, the remote controller is a computing platform such as a smartphone, which can configure, operate, and query the status of the LED driver. The status of the LED driver may include on/off, intensity level, energy being consumed by the LED load, configuration settings, and other useful information such as serial number, manufacturing date, country of origin, and ratings. The Wi-Fi embodiment of the LED driver enables the LED driver to be controlled using the Internet and become part of the network of Internet of Things (IoT).

9 Claims, 26 Drawing Sheets

(a)

(b)

(c)

(d)

(a)

(b)

(a)

(b)

(a)

(b)

(a)

(b)

MULTIFUNCTIONAL UNIVERSAL LED DRIVER

RELATED APPLICATIONS

This current application is a utility application and claims the benefit of U.S. Provisional application No. 61/957,282, filed Jun. 28, 2013, titled "Multi-Function Universal LED Driver". This current application also claims the benefit of the following pending application and two issued U.S. patents:

1. Patent application Ser. No. 12/324,200, filed Nov. 26, 2008, titled "LED Driver and Integrated Dimmer and Switch;
2. U.S. Pat. No. 8,344,639 B1, filed Jan. 31, 2010, issued Jan. 1, 2013, titled "Programmable LED Driver";
3. U.S. Pat. No. 8,575,851 B1, filed Dec. 27, 2012, issued Nov. 5, 2013, titled "Programmable LED Driver".

The disclosures of the aforementioned Issued Patents and Patent Applications are hereby incorporated herein by reference hereto.

BACKGROUND OF THE INVENTION

Technical Field

The present invention relates to an LED (light emitting diode) driver with control means configurable by an end user of the driver to match the load requirements of an LED load. The driver is adapted to be mounted within an AC outlet box.

Brief Description of the Prior Art

LED is abbreviation of "Light Emitting Diode", which is a small electronic device that emits light when an electric current is passed through it. The term diode refers to a family of two-pin semiconductor devices. The current can pass through them only in one direction. The first LED's were red. They were introduced to the market decades ago. The early red LED's quickly found applications as tiny indicators on audio equipment, TV's, and even digital wrist watches. Later, LED's were used as seven-segment display modules, and the first pocket calculators used them. Years of research has introduced all sorts of colorful LED's to the market. The most common LED's are red, green, yellow, blue, and orange. The color of LED is due to the material used in the LED chip, not just the color of the package. In the past several years, the LED market has seen a big jump in the brightness of the LED's, and white LED's have been introduced that produce enough light that they have been used in cars and general lighting.

The main advantages of LED's are long life span (some exceeding 100,000 hours), and high efficiency compared to small tungsten or incandescent lights. Additionally, they generate very little heat when they are operated at the rated current. They can also take a harsh environment, as there is no filament in them. The disadvantages (at least when compared to 110V tungsten light bulbs) are that they cannot directly replace incandescent lamps, and, a single LED is very small and generally cannot generate enough light to light up a room. Therefore, the LED's for generating a large amount of light are typically used in clusters. Some designers used them in series strings, some use them in parallel strings, and some use them in a combination of series and parallel strings.

The LED's are typically used in constant-voltage constant-current circuits. The early LED's required only 10 milli-amperes to operate. Many new ultra-bright white LED arrays require a current of 750 milli-amperes or more to operate at maximum brightness.

The term "LED driver" refers to any kind of electronic circuit that produces the current and voltage necessary to turn on a specific LED or cluster of LED's. For example, some LED drivers can take as input the 12 VDC from a car battery, and generate enough current to turn on a combination cluster of 20 LED's used in a tail light. Another example is an LED driver that turns on a combination of LED clusters used as the backlighting for flat panel LCD displays (the LED's have effectively replaced the fluorescent back lighting).

The LED driver for commercial and residential lighting is different because the input voltage will typically be 110 volts AC. This voltage needs to be converted to DC and also it needs to be regulated such that it does not feed more than the necessary amount of current to the LED's. If the LED's are driven by higher currents and voltage than their rated values, their life span will significantly shorten or they may even burn out quickly.

Currently, the LED drivers used by lighting companies for fixtures such as chandeliers are so large they can barely fit into the ceiling or fixture canopy. The drivers also do not have any onboard or external dimmer. It has been proposed to use a conventional incandescent 110 volt AC dimmer for dimming LED's. This is an awkward way of solving the problem because two units have to be installed, one in the ceiling and one in the wall outlet for the fixture. In addition, there are compatibility issues between LED drivers and incandescent dimmers.

U.S. Pat. No. 8,492,988 discloses a configurable load control device for light-emitting diode light sources, in which the control means for dimming is a conventional phase-controlled dimmer switch. The LED driver is then connected to the output of a conventional phase-controlled dimmer switch.

U.S. Pat. No. 8,169,387B2 discloses a programmable LED driver. The LED driver cannot be configured by an end user. Additionally, the LED driver does not directly connect to AC mains and cannot be installed in a standard AC outlet. Further, no dimming functionality has been disclosed.

Published US application 2004/0212321 discloses an LED driver configured to provide power from an AC 110 volt circuit to a plurality of LED's. The driver uses a conventional phase-controlled dimmer for dimming functionality.

Published US application 2006/0113975 discloses controlling output current of a DC/DC converter. While this circuit could be employed in an LED driver, it does not disclose the technology of the present invention.

U.S. Pat. No. 6,940,733 discloses a power supply using a frequency modulated pulse train for optimal power conversion. The circuitry of the present invention employs a fixed frequency.

U.S. Pat. No. 7,145,295 discloses a simple design for controlling light emitting diodes. While this design could be used for dimming LED's, it does not disclose a technology as how to power, dim, and switch LED's on/off in an offline application that could also be fit in an AC outlet for lighting applications.

Published Data Sheet HV9910 titled "Universal High Brightness LED Driver" by Supertex, Inc., 1235 Bordeaux Drive, Sunnyvale, Calif., 94089, discloses a PWM high efficiency LED driver control IC. It allows efficient operation of High Brightness (HB) LED's from voltage sources ranging from 8 VDC up to 450 VDC. The HV9910 controls an external MOSFET at fixed switching frequency up to 300 kHz. The frequency can be programmed using a single resistor. The LED string is driven at constant current rather than constant voltage, thus providing constant light output and enhanced reliability. The output current can be programmed between a few milliamps and up to more than 1.0 A. The HV9910 uses a rugged high voltage junction isolated process that can withstand an input voltage surge of up to 450V. Output current to an LED string can be programmed to any value between zero and its maximum value by applying an external control voltage at the linear dimming control input of the HV9910. The HV9910 provides a low-frequency PWM dimming input that can accept an external control signal with a duty ratio of 0-100% and a frequency of up to a few kilohertz.

Published book "Power Supplies for LED Drivers" by Steve Winder, published by Elsevier Inc., 2008, covers a number of LED driving methods such as the Buck-based LED drivers, but does not suggest any control means or any configuration means for an LED driver that installs in an AC outlet box that can be controlled and/or configured by an end user.

None of the above items of prior art disclose or suggest a means for configuring the output characteristics of the LED driver by an end user.

SUMMARY OF THE INVENTION

An LED driver 10 comprises a rectifier 14 adapted to receive an AC line current and to rectify said AC line current into a DC current. A switching LED driver circuit 20 is operatively connected to said rectifier 14 to receive said DC current, said switching LED driver circuit 20 being adapted to produce a DC output and including output leads 26 connected to an LED load 28. A user control means 34 is operatively connected to said switching LED driver circuit 20, said user control means 34 providing an interface between an end user of the LED driver 10 and said switching LED driver circuit 20, said interface comprising on/off means for on/off control of said DC output. A configuration control means 22 comprising means adjustable by an end user of the LED driver 10 adapted to adjust the output voltage and/or output current of said switching LED driver circuit 20 to match various voltage and/or current level requirements of an LED load 28. The user control means 34 is adapted so that said on/off control and said interface are relatively accessible to an end user of the LED driver 10 during normal operation of the LED driver 10, and said configuration control means 22 is adapted so as to be relatively inaccessible during normal operation of the LED driver 10.

In an embodiment of the present invention, the LED driver 10 is in the form of an integrated unit sized small enough to fit within an AC outlet box and includes an enclosure, an enclosure faceplate and a wall cover plate wherein said user control means 34 is adapted for mounting on said enclosure faceplate so as to be exposed to an end user of the LED driver 10 during normal operation of the LED driver 10 and wherein said configuration control means 22 is adapted for mounting so as to be relatively inaccessible during normal operation of the LED driver 10. In one example, said configuration control means 22 is mounted on the enclosure faceplate so as to be covered by said wall cover plate during normal operation of the LED driver 10.

The configuration control means 22 can be password protected so as to be relatively inaccessible during normal operation of the LED driver 10.

The AC outlet box can be an AC outlet gang box wherein one larger LED driver 10 or multiple LED drivers 10 or components thereof are positioned in said AC outlet gang box.

The LED driver 10 can comprise a PWM generator 30 adapted to generate a PWM signal with a duty cycle, means operatively connecting said user control means 34 with said PWM generator 30, said user control means 34 comprising switch means for on/off and dimming control of said PWM signal, and means operatively connecting said PWM generator 30 with said switching LED driver circuit 20 to provide said switching LED driver circuit 20 with said PWM signal whereby said switching LED driver circuit 20 produces an output controlled by said PWM signal.

In another embodiment of the present invention, the LED driver 10 comprises a remote controller 35 and a remote user control means 34w located in said remote controller 35, said LED driver 10 further comprising means to wirelessly transmit a signal from said remote user control means 34w to said switching LED driver circuit 20 for on/off control of said switching LED circuit output.

In an example of this embodiment, a programmable integrated circuit 298 operatively connects to said switching LED driver circuit 220 to generate a control signal for control of said LED load 228. A user control means 234 operatively connects to said programmable integrated circuit 298 for user control of said control signal, said user control means 234 comprising a wireless receiver 200. A wireless remote computer platform 204 comprising wireless means for wirelessly transmitting control instructions to said wireless receiver 200, said remote control platform including a remote user control means 206 adapted to generate said instructions.

The remote controller 35 can be a platform selected from the group consisting of smart phones, computers, tablets, and notebooks, wherein said remote user control means 34w is implemented in the in the graphical user interface (GUI) of said remote controller 35.

In a preferred example of this embodiment, the LED driver 10 uses a wireless protocol selected from the group consisting of Wi-Fi and/or Bluetooth.

In another example of this embodiment, receiver 200 is a transceiver and said LED driver 210 comprises means for transmitting the power consumption of said LED load 228 and/or its status to said remote controller platform 204 in response to a query received from said remote controller platform 204. The LED driver 210 can transmit the power consumption of said LED load 228 and/or its status to local Wi-Fi devices in a local area network or its status to other websites via TCP/IP.

In another embodiment, a light sensor 178 provides a feedback signal 181 to said programmable integrated circuit 98; said programmable integrated circuit 98 being programmable to automatically adjust the duty cycle of said PWM signal in response to said feedback signal 181 in order to maintain a constant light level in the surrounding environment, the user control means 34 being operatively connected to said programmable integrated circuit 98 and comprising adjustment means 194 for on/off and/or brightness adjustment of said LED load 28, and a manual override switch 198 to disable the automatic adjustment of said PWM signal.

In another embodiment, the LED driver 10 comprises a motion detection circuit 186, a motion detector 182 operatively connected to said motion detection circuit 186, said motion detection circuit 186 comprising a sensitivity adjustment 190 to adjust the range for motion detection, and an on-time adjustment 192 to adjust the on-time duration of said motion detection circuit 186 after each motion detection; wherein the output of said motion detection circuit 182 is operatively connected to said programmable integrated circuit 298 to turn said PWM signal ON when the output of said motion detection circuit 186 is on.

In another embodiment, the LED driver comprises a real-time clock 170 operatively connected to said programmable integrated circuit 98 to keep track of the current time; a user control means 34 operatively connected to said programmable integrated circuit 98 comprising one or more navigation switches 34s, 34t, and 34u to activate menus, select fields within menus, and to enter dates for on-time and off-time or brightness level of said LED load 28, a manual override switch 34x to disable the automatic operation of said LED driver 10, one or more switches or means 34v to manually turn on/off and/or adjust the brightness of the LED load 28, and a display to reflect the entered data, scheduled programs, and the status of said LED driver 10.

BRIEF DESCRIPTION OF THE DRAWINGS

The present invention and advantages thereof will become more apparent from the following description with reference to the accompanying drawings, in which:

FIG. 5a is a schematic drawing illustrating the basic circuitry of a "buck" power supply built around the use of an oscillator;

FIG. 5b is a schematic drawing detailing the oscillator of FIG. 5a;

FIG. 5c is a schematic drawing showing construction of a "buck" switching LED driver circuit of FIG. 1 using the oscillator of FIG. 5b and other discrete components;

FIG. 7a is the block diagram of an HV9910B LED driver integrated circuit;

FIG. 7b is a schematic drawing showing application of the HV9910B integrated circuit of FIG. 7a in the control circuit 56 of FIG. 6a.

FIG. 8a is the block diagram of a wireless embodiment of the LED driver of FIG. 1, showing the application of a programmable integrated circuit as a PWM generator.

FIG. 8b is the block diagram of the wireless remote controller of FIG. 8a.

FIG. 20a shows a typical three-terminal rotary encoder circuit.

FIG. 20b shows the waveforms at terminal-A and terminal-B of the rotary encoder illustrated in FIG. 20a.

FIG. 20c illustrates the application of a rotary encoder in the LED driver for making adjustments to the brightness of LEDs.

DETAILED DESCRIPTION OF THE PRESENT INVENTION

The present invention resides in a universal multi-function LED driver with integrated switch and preferably dimmer that can be configured to match the voltage and current requirements of an LED load. The term universal signifies that the same design can be adapted to operate globally with different AC line voltages with no need for an external adapter. The LED driver employs one or more programmable integrated circuits; therefore, the disclosed LED driver is programmable. The configurable multi-function LED driver, in one embodiment, is intended for installation in a standard AC outlet and connects directly to the existing wiring in the AC outlet with no need for making changes to the existing wiring. The output voltage and/or the output current of the LED driver are configurable using one or more switches installed, in this embodiment, on the housing or under the faceplate of the finished product so that they can be preset by a user to match the specific voltage and current requirements of an LED load such as a lighting fixture. In a wireless embodiment of the present invention, the output voltage and/or the output current can be configured wirelessly.

Figure 1:
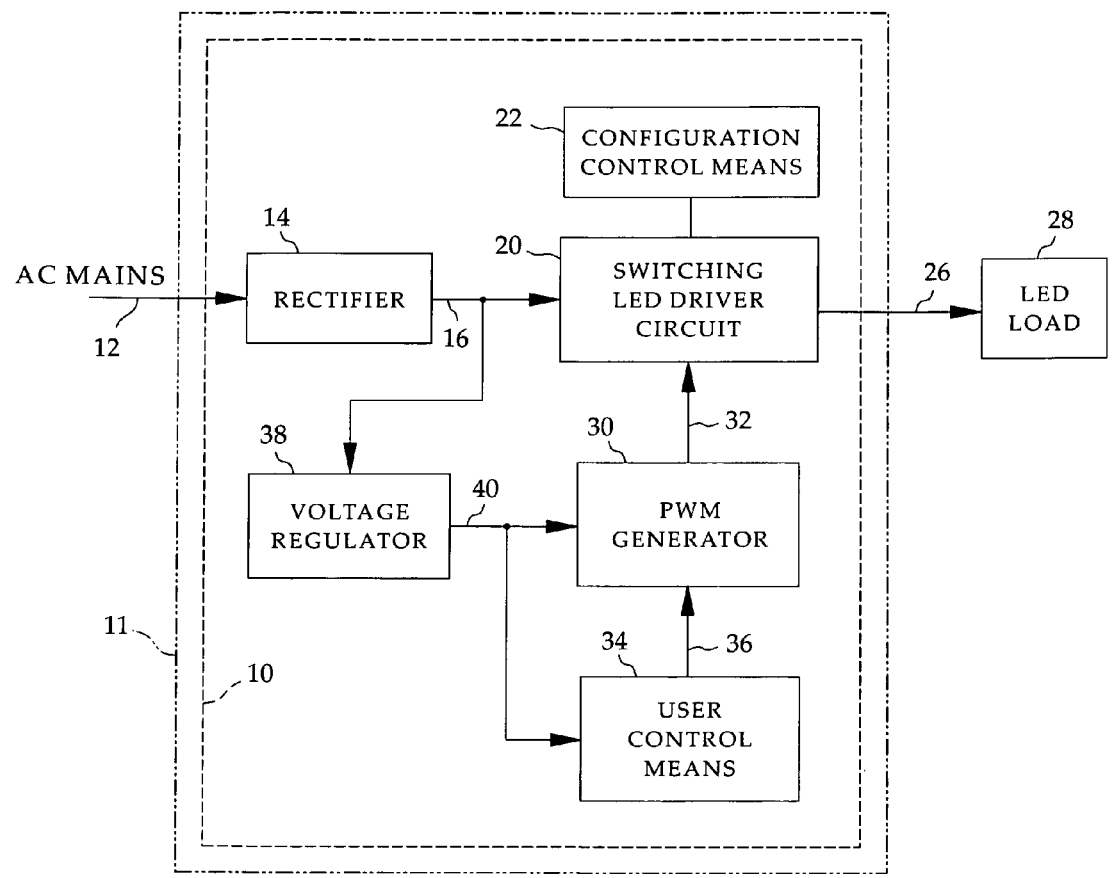
FIG. 1 is a block diagram illustrating one embodiment of an LED driver of the present invention using a switching LED driver circuit known as a "buck" driver.

FIG. 1 depicts a block diagram of the LED driver 10 of the present invention. Referring to FIG. 1, the LED driver 10 is adapted to connect directly to the AC mains wires 12 in an AC outlet box, shown in dashed lines 11. It should be noted that no power transformer is used to step down the AC mains voltage as required by the LED load 28, as power transformers are bulky, heavy, and expensive. The AC mains voltage is rectified and filtered in rectifier 14. The rectified output from the rectifier 14 is applied to a switching LED driver circuit 20. A configuration control means 22 presets, i.e. configures, the output voltage and the output current of the switching LED driver circuit 20. The output 26 of the LED driver circuit 20 is applied to an LED load 28, which can be any type of LED lighting fixture such as a ceiling lamp, chandelier, wall sconce, under cabinet lighting, closet lighting, outdoor, etc.

The LED driver 10 may include an onboard low voltage regulator 38, which provides a low regulated voltage to other circuits and peripherals of the LED driver 10. Voltage regulator 38 is preferably an offline voltage regulator to provide power to circuit components used for control, dimming, and user interface, as will be described. The use of an offline voltage regulator in 38 is preferred. However, those skilled in the art will find it possible to use other components to generate a low regulated voltage to power electronic components. For example, a miniature transformer and regulator circuit may generate the necessary power required by the circuit components. It is important to note that the miniature transformer will apply a very low power to the circuit components, not to the LED load 28. It should also be noted that the DC current required by the circuit components is a fraction of the DC current required by the LED load 28. It is also possible to use a power resistor or capacitor in series with a Zener diode, voltage regulator, or a voltage reference to generate the low output voltage to power the circuit components. However, using a resistor wastes energy and generates unwanted heat.

There are two methods for dimming LEDs: analog, and PWM (pulse width modulation). Analog dimming is achieved by reducing the current in the LEDs. PWM dimming is achieved by reducing the duty cycle of the applied PWM signal while applying the rated voltage and current to the LEDs. Analog dimming in residential lighting has a major drawback, namely an LED color shift. Lowering the LED current causes a subtle change in radiant wavelength. As such, PWM dimming is the preferred method of dimming LEDs used in the lighting industry because the LED current remains constant as the LEDs are dimmed. In the present invention, PWM is used for dimming.

The LED driver 10 comprises a PWM generator 30. PWM generators are well known. In the present invention, the PWM generator 30 generates an on/off and, if desired, a dimming signal that is/are fed to the LED driver circuit 20 for the purpose of turning them on or off and, if desired, dimming the LEDs. In essence, the PWM generator 30 may contain one or more programmable integrated circuits or ASICS to implement various functions, described below. In the embodiment of FIG. 1, the power supply for the components of 30 is generated by voltage regulator 38.

The LED driver 10 also comprises a user control interface 34, as will be described, that includes the means that allow an end user to operate the LED driver and control the various functions of the finished product. The user control interface may include components that need to be powered by voltage regulator 38 as shown by the leads 40.

In the embodiment of FIG. 1, the LED driver 10 is an integrated unit sized small enough to be inserted into the AC outlet box 11, also called a junction box, shown in dotted-dashed lines 11, encompassing the LED driver 10 and components thereof.

The switching LED driver circuit 20 can be any switching LED driver topology that converts the rectified mains voltage 16 (FIG. 1) to a voltage required by the LED load 28. The buck switching LED driver circuit is described herein.

Figure 5:
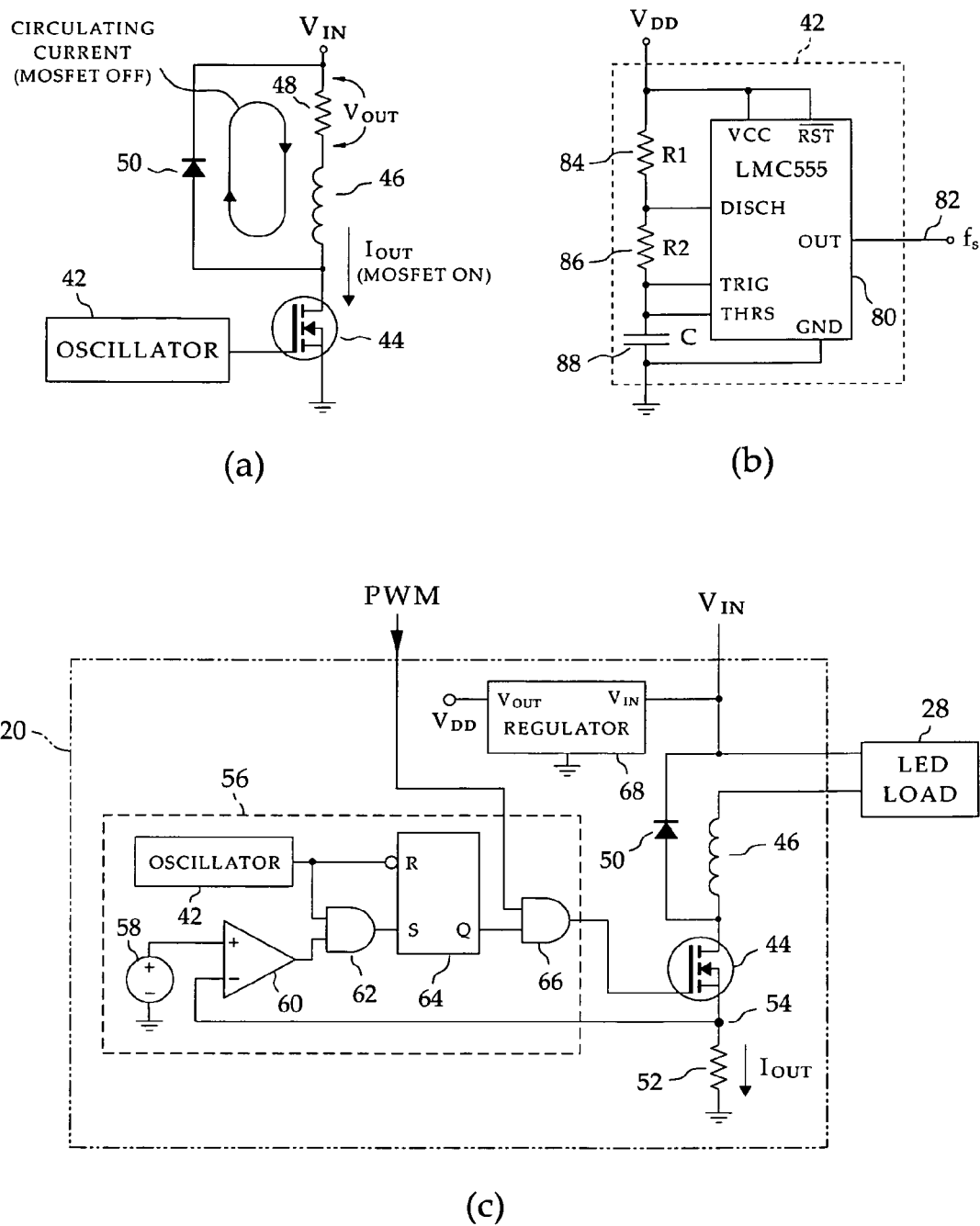

Buck switching converters are well-known and are extensively used in switching power supply and LED driver designs. The buck switching converters are highly efficient DC-DC converters that are used to convert a DC voltage to a lower DC voltage. The building blocks of a basic buck power supply are shown in FIG. 5a, which includes a MOSFET 44, an oscillator 42, an inductor 46, a diode 50, and a load 48. The oscillator 42 generates pulses at a switching frequency ($f_s$) that "open" and "close" the MOSFET 44, employed as a semiconductor switch. When the MOSFET 44 is on, i.e. "closed", the output current ($I_{out}$) flows through the inductor 46 and the load 48, and a magnetic field is developed in the inductor 46. When the MOSFET 44 is off, i.e. "open", the magnetic field collapses in the form of an electric current that circulates in the series circuit formed by the inductor 46, the load 48, and the diode 50. Therefore, the electric current flows in the load 48 even when the MOSFET 44 is "open". As such, during one complete cycle of a pulse generated by the oscillator 42, a "packet of energy" is transferred from the supply to the load 48. This "packet of energy" is transferred very efficiently, because the relative losses in the circuit compared to the amount of energy transferred to the load 48 are very small. A well-designed buck converter using low-loss components can have an efficiency of 90% or better. Most buck converters are usually designed to operate in continuous-current mode CCM, meaning that the inductor current never falls to zero at the end of the inductor discharge cycle.

In FIG. 5a, the switching frequency of the oscillator 42 and the inductance of the inductor 46 are two parameters that a designer can work with to obtain a desired output voltage ($V_{OUT}$) and output current ($I_{OUT}$), given an input voltage $V_{in}$. For a continuous-current mode CCM buck converter, the inductance is computed from the following equation (1):

$$L=(V_{OUT}*(1-V_{OUT}/V_{IN}))/(0.3*I_{OUT}*f_S) \qquad (1)$$

It should be noted that the above equation (1) assumes that the components are ideal, meaning that the inductor 46 has zero wire resistance, the MOSFET 44 has zero resistance at on-time, the forward voltage of the diode 50 is zero, and the MOSFET 44 has zero capacitive losses when switching.

In Equation (1), the inductance (L) and the switching frequency ($f_s$) of the oscillator 42 are inversely proportional, meaning that a higher frequency for (fs) results in a smaller inductor. Although a smaller inductor is desirable, since the inductor is physically one of the largest components in a buck switching converter design, a very high switching frequency increases the capacitive losses in the MOSFET. As the result, it is desirable to have the option of adjusting (L) as well as ($f_s$).

FIG. 5b illustrates an example for the oscillator 42, built around the integrated circuit LMC555 (80), available from several manufacturers such as Texas Instruments, Dallas, Tex. The LMC555 is an integrated circuit that can be used for timing, pulse generation, and oscillator applications. The output frequency 82 of the oscillator 42 is determined using the following equation, in which the resistor R1 can be adjusted to adjust the output frequency $f_s$:

$$f_S=1.44/((R_1+2R_2)*C) \qquad (2)$$

FIG. 5c illustrates the building blocks of a switching LED driver circuit 20 (in FIG. 1), which is very similar to the buck power supply illustrated in FIG. 5a. The MOSFET 44, diode 50, and inductor 46 are the same. An LED load 28 replaces the load 48 (FIG. 5a), and a current sense resistor 52 is placed in series with the MOSFET 44, inductor 46, and LED load 28 (FIG. 5c). The oscillator 42 and few additional components form a controller circuit 56. The controller circuit 56 is a voltage-mode controller that regulates the output current ($I_{OUT}$) in a closed-loop voltage feedback control circuit.

The controller circuit encompassed in 56 can be designed in different ways using various discrete components. The one shown in FIG. 5c is comprised of an oscillator 42, a comparator 60, AND gate 62 and 66, a voltage reference 58, and a SR flip-flop 64.

In FIG. 5c, the output current ($I_{out}$) flows through the series circuit consisting of the LED load 28, the inductor 46, the MOSFET 44, and the current sense resistor 52. The flow of current through the current sense resistor 52 develops a feedback voltage 54 that is fed to the comparator 60.

The value of the current sense resistor 52 is computed such that under normal conditions the peak current that flows through the current sense resistor 52 develops a peak feedback voltage 54 that is slightly under the reference voltage 58. In this manner, the feedback voltage 54 is below the reference voltage 58; therefore, the output of the comparator 60 is at a logical high, and oscillator pulses can pass through the AND gate 62 and to the SR flip-flop 64. Assuming that the applied PWM is at a logical high, all the pulses from the oscillator 42 make it to the gate of the MOSFET 44 and the circuit works at a state of equilibrium.

If the output current ($I_{out}$) abnormally rises to a level that the generated feedback voltage 54 exceeds the reference voltage 58, the output of the comparator 60 falls to the low logical state. Therefore, the AND gate 62 inhibits the pulses from the oscillator 42 and delays the "setting action" on the SR flip-flop 64. This situation extends the off-time of the MOSFET 44, allowing the circuit to return to the state of equilibrium.

The value of the current sense resistor 52 is determined by application of Ohm's Law for the known reference voltage 58 and the desired output current ($I_{out}$); however, an additional factor, i.e. the inductor ripple current factor, is considered in the equation due to the fact that the output current has "ripples" caused by the charge-discharge cycle of the inductor 46. If the inductor's ripple current is not factored in, the feedback voltage 54 exceeds the reference voltage 58 on every peak caused by the inductor's ripple current. $V_{REF}$ is chosen to be a stable and relatively low reference voltage in order to keep the resistance of the current sense resistor 52 small, thus keeping the power rating, package size, and power losses of the current sense resistor 52 small.

The resistance of the current sense resistor 52 is computed from:

$$R_{CS}=V_{REF}/(1.15*I_{OUT}) \qquad (3)$$

In equation (3), $V_{REF}$ is the reference voltage 58, and $I_{out}$ is the output current.

There are many types of designs that can be used for the oscillator 42. For example, as shown in FIG. 5b, analog components can be used to design an analog oscillator so that the resistor 84 or the capacitor 88 can be adjusted in order to adjust the frequency of the generated pulses. It is also possible to use digital components or a programmable integrated circuit to generate pulses with adjustable frequency.

In the switching LED driver 20 (FIG. 5c), as described in the aforementioned paragraphs, the inductance of the inductor 46, the switching frequency of the oscillator 42, and the current sense resistor 52 are the parameters that can be adjusted to generate a desired output voltage ($V_{OUT}$) and output current ($I_{OUT}$) for a given input voltage ($V_{IN}$). The range for the input voltage ($V_{IN}$), which is applied to the switching LED driver circuit 20, depends on the voltage rating of the components such as the MOSFET 44, diode 50, and voltage regulator 68, which are available at wide operating ranges exceeding 350V. For example, the MOSFET STD7NM50N from STMicroelectronics has a drain-to-source voltage of 500V, the diode STTH2R06 from STMicroelectronics has a maximum DC reverse voltage of 600V, and the offline voltage regulator LR645 from Suptertex accepts input voltages ranging from 15V to 450V; therefore, the input voltage to the switching LED driver circuit 20 can range from 15 VDC to 450 VDC. The input ($V_{IN}$) of the switching LED driver 20 is the AC mains 12, which is rectified and filtered by the rectifier 14. Therefore, the LED driver 10 can connect to a very wide AC mains voltage range. In the above example, the AC mains 12 can range from 10.6 VAC to 318.2 VAC (i.e. the rectified DC voltage divided by 1.414). This range covers the AC mains voltage of all countries in the world; therefore, it is universal.

Figure 6:
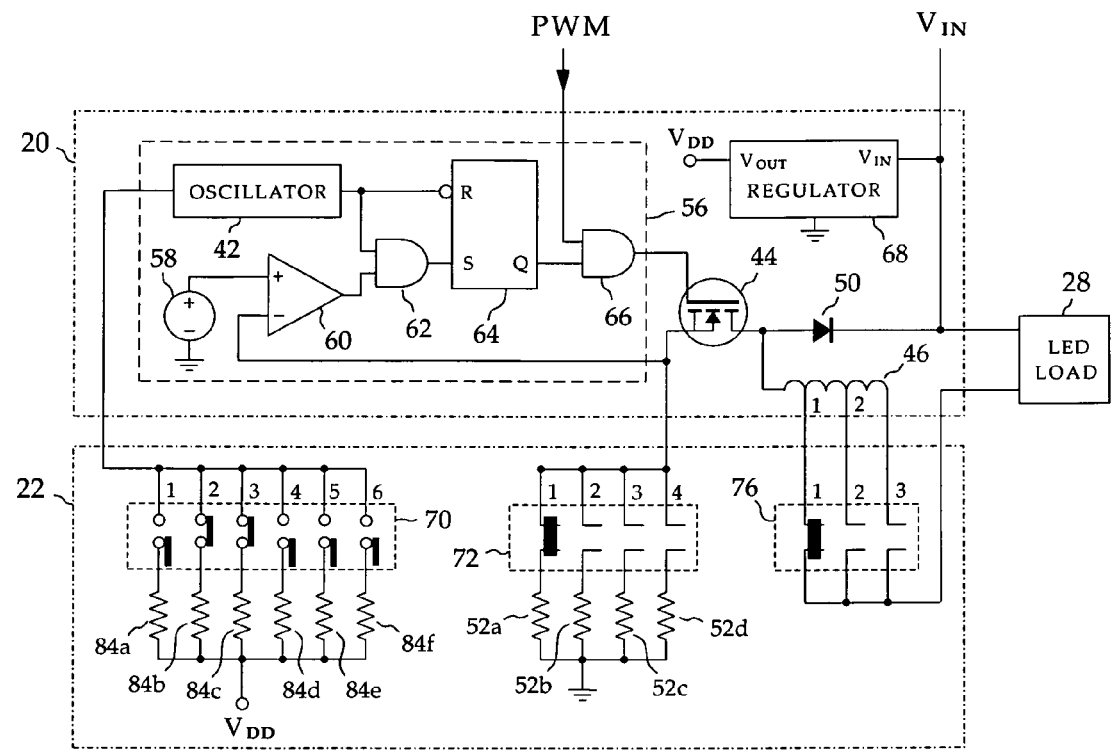
FIG. 6a is a schematic drawing showing the "buck" driver of FIG. 5c connected to configuration control means.
FIG. 6b illustrates an exemplary DIP switch that can be employed in FIG. 6a for setting the frequency of the oscillator of FIG. 5b.
FIG. 6c illustrates an exemplary four-position breakaway header that can be employed in FIG. 6a for setting a current sense resistor.
FIG. 6d illustrates an exemplary three-position breakaway header that can be employed in FIG. 6a for setting inductance.
Figure 6:
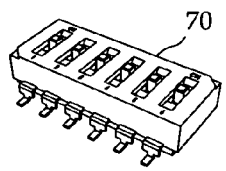
Figure 6:
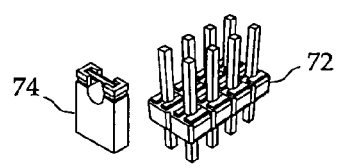
Figure 6:
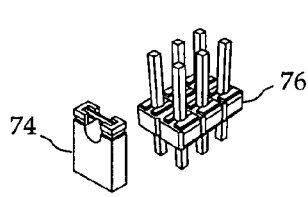

As disclosed in the main block diagram (FIG. 1) of the present invention, the output voltage and/or current of the switching LED driver circuit 20 is configurable via the configuration control means 22. As illustrated in FIG. 6a, the configuration control means 22 is comprised of the switch blocks 70, 72, and 76, each including a bank of one or more switches used to adjust parameters that control the output voltage and/or output current.

The switch block 70 is used to configure (i.e. preset) the frequency of the oscillator 42. In the example shown in FIG. 6a, the switch block 70 is a six-position DIP switch, comprising of six on-off switches. For instance, if position '1' of the switch block 70 is closed, the resistor 84a sets the frequency of the oscillator 42. If position '2' and '3' are closed while the remaining switches in the bank are open, then the equivalent resistance of '84b in parallel with 84c' sets the frequency of the oscillator 42. The higher the number of the switches used in the switch block 70, the higher the number of selectable frequencies for the oscillator 42.

The switch block 72 is used to configure the current sense resistor 52. The switch block 72 needs to have a proper current rating, as the output current flows through the current sense resistor. In the example shown in FIG. 6a, the switch block 72 is a 4-position breakaway header, comprising of four sets of pins. A shorting jumper 74 (shown in FIG. 6c), when placed on a set of pins, shorts the pins (i.e. closes the "switch"), connecting the corresponding current sense resistor to the ground. Typically, breakaway headers and shorting jumpers have much higher switch rating than DIP switches. For instance, the breakaway header 22-28-4024 manufactured by Molex, Lisle, Ill., has a contact rating of 4 A at 250V.

The switch block 76, shown in FIG. 6a, is a three position breakaway header that is used to select three values of inductance from the inductor 46. The inductor 46 shown in FIG. 6a is an inductor with two taps. A two tap inductor provides three values of inductance. For example, placing a shorting jumper on position '1', selects tap '1' of the inductor; and placing a shorting jumper on position '3' selects the full inductance.

The larger the switching frequency of the oscillator 42, the smaller the inductance of the inductor 46. However, too high of switching frequency will increase switching losses in the circuit. Having an adjustable inductor helps better management of the switching frequencies in order to lower the switching and copper losses. It is important to note that not all applications require the presence of all three of the switch blocks 70, 72, and 76. For instance, an application may not require a multi-tap inductor, in which case the switch block 76 will be unnecessary.

FIG. 6b depicts an exemplary six-position surface-mount DIP switch 70. FIG. 6c depicts an exemplary four-position breakaway header 72 and a shorting jumper 74. FIG. 6d depicts an exemplary three-position breakaway header 76. It is important to note that other kinds of switches, headers, receptacles, sockets, or connectors may be employed. The number of positions for each switch block is determined by the finished product requirements.

As described in the aforementioned paragraphs, the switching LED driver circuit 20 may be designed and built using discrete components; however, an application specific switching LED driver integrated circuit reduces the component count and costs. For example, the integrated circuit HV9910B manufactured by Supertex Inc., Sunnyvale, Calif., is a buck switching LED driver that integrates all the components of 56. In addition, it has an onboard regulator 68. The HV9910B requires very few external components. As the result, a completed switching LED driver circuit 20 based on HV9910B is very compact, lightweight, and low-cost.

Figure 7:
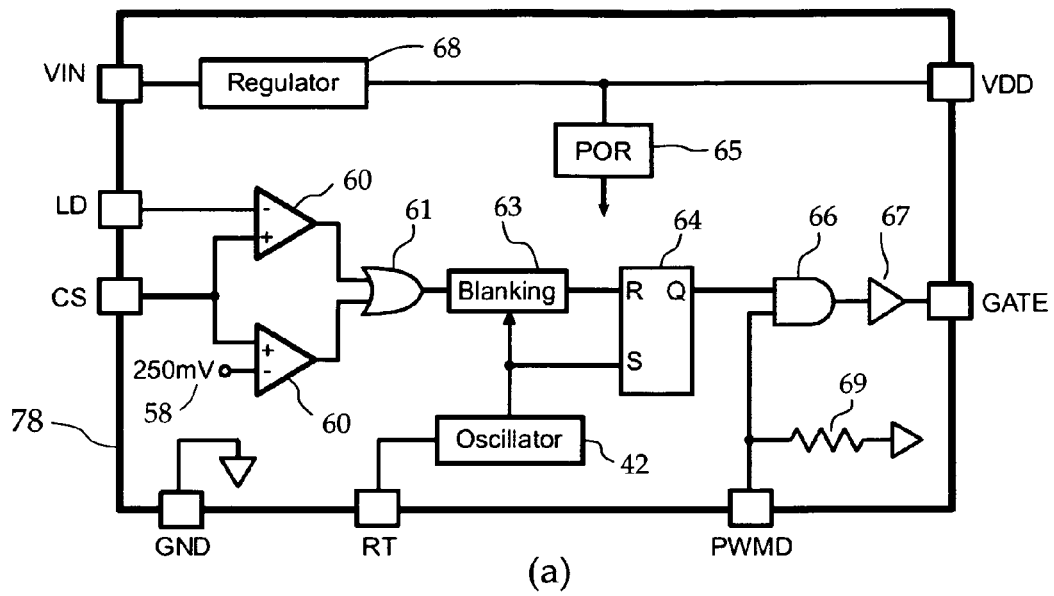
Figure 7:
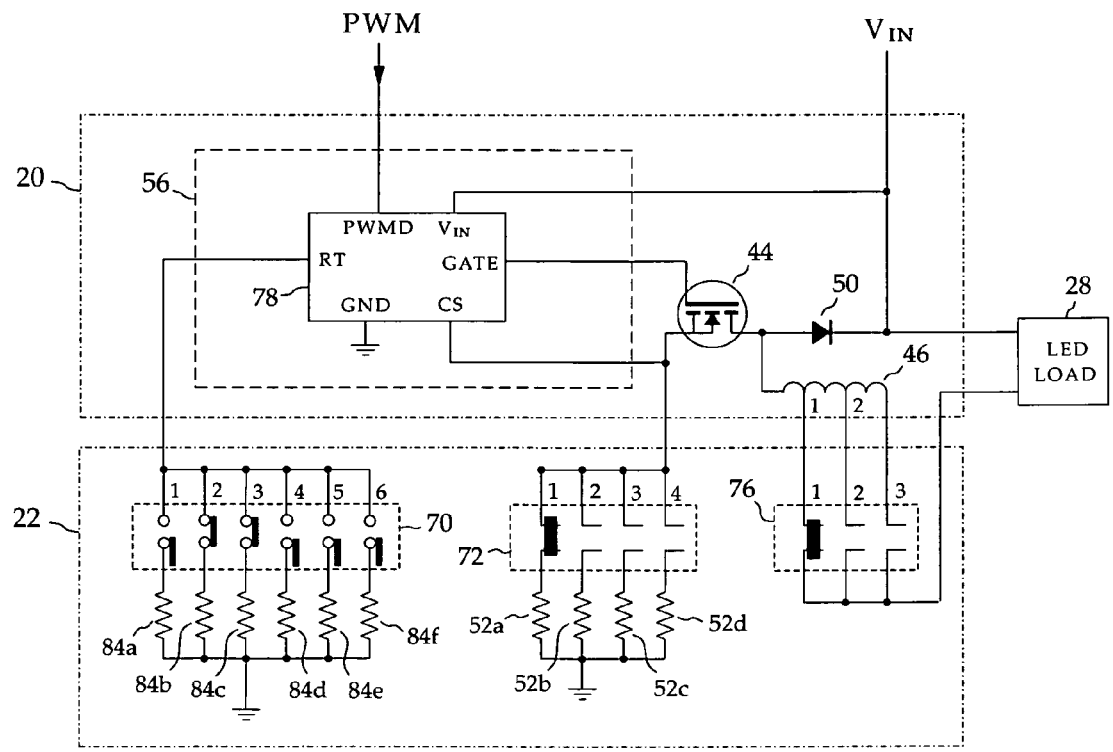

FIG. 7a, directly copied from the data sheet for the HV9910B, incorporated by reference herein, shows the building blocks of the HV9910B and the available pins on its package for external connections. The building blocks include components such as an off-line voltage regulator 68, power-on-reset 65, oscillator 42, reference 58, blanking 63, comparators 60, SR flip-flop 64, OR gate 61, AND gate 66, and buffer 67. The onboard off-line voltage regulator 68 is particularly useful because it can supply power to external components or circuits. Therefore, an integrated circuit, such as HV9910B, reduces the component count and costs. However, the on-chip voltage regulator 68 has a limited output current. If the supply current required by the external components exceeds the output current capability of the on-chip voltage regulator, an external higher power voltage regulator should be employed.

Referring to FIG. 7b, the HV9910B integrated circuit 78 has replaced the discrete components of 56. The external components that HV9910B requires are the same as the circuit shown in FIG. 6a. The detailed operation of the HV9910B is described in the datasheet of the HV9910B.

Figure 2:
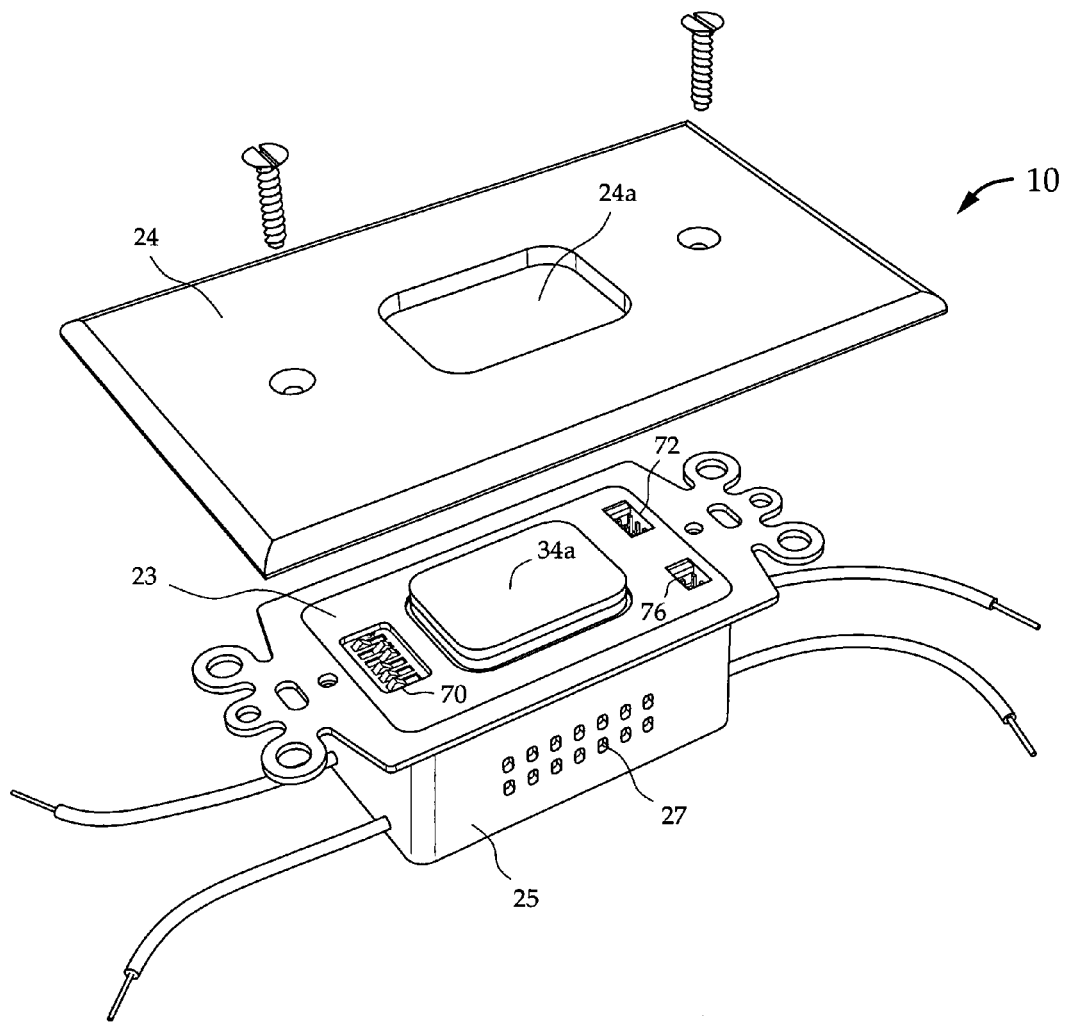
FIG. 2 is an exploded view of the LED driver of FIG. 1 showing components of the LED driver.

Referring to FIG. 2, the overall appearance of one embodiment of the present invention is shown, which is an LED driver 10 with integrated dimmer and switch. The output voltage and the output current of the LED driver 10 can be adjusted so that the LED driver can power various LED loads having various voltage and current requirements. The LED driver 10 Shown in FIG. 2 fits in a conventional single-gang outlet box.

FIG. 2 depicts the LED driver 10 having a single momentary push-button switch 34a to adjust the brightness of the LEDs or to turn them on or off. A quick press and release of the switch 34a will toggle the light between on and off. Pressing and holding the switch 34a will begin to dim the light until the switch is released. The next pressing and holding of the switch 34a will cause the light to brighten until the switch is released. As such, each subsequent pressing and holding of the switch 34a will alternate between the dimming/brightening of the LED light.

FIG. 2 further depicts the configuration control means comprising of the switch blocks 70, 72, and 76, for presetting the output voltage and/or output current that are implemented on faceplate 23 of the enclosure 25. In this arrangement, the user first presets (i.e. configures) the output voltage and/or output current of the LED driver 10 according to a lookup table provided by the manufacturer to match the electrical requirements of the LED lighting fixture using the switch blocks 70, 72, and 76. After installing the LED driver 10 into an AC outlet, the wall cover plate 24 conceals the switch blocks 70, 72, and 76 making it relatively inaccessible and preventing it from being tampered with. The advantage of this arrangement is that the user does not need to remove the LED driver from the AC outlet if he/she decides to upgrade the LED lighting fixture requiring reconfiguration of the LED driver 10. All that is necessary is to remove the wall cover plate 24 to expose the switch blocks 70, 72, and 76.

Other types of configuration control means are described in the detailed description of the present invention. The wall cover plate 24 has a cutout 24a in the center thereof. The cutout 24a is aligned with and conforms to the dimensions of the momentary push button switch 34a thereby exposing the switch 34a to the user of the LED driver making the switch 34a readily accessible to the user for easy control (on/off and dimming) of the LEDs.

Figure 3:
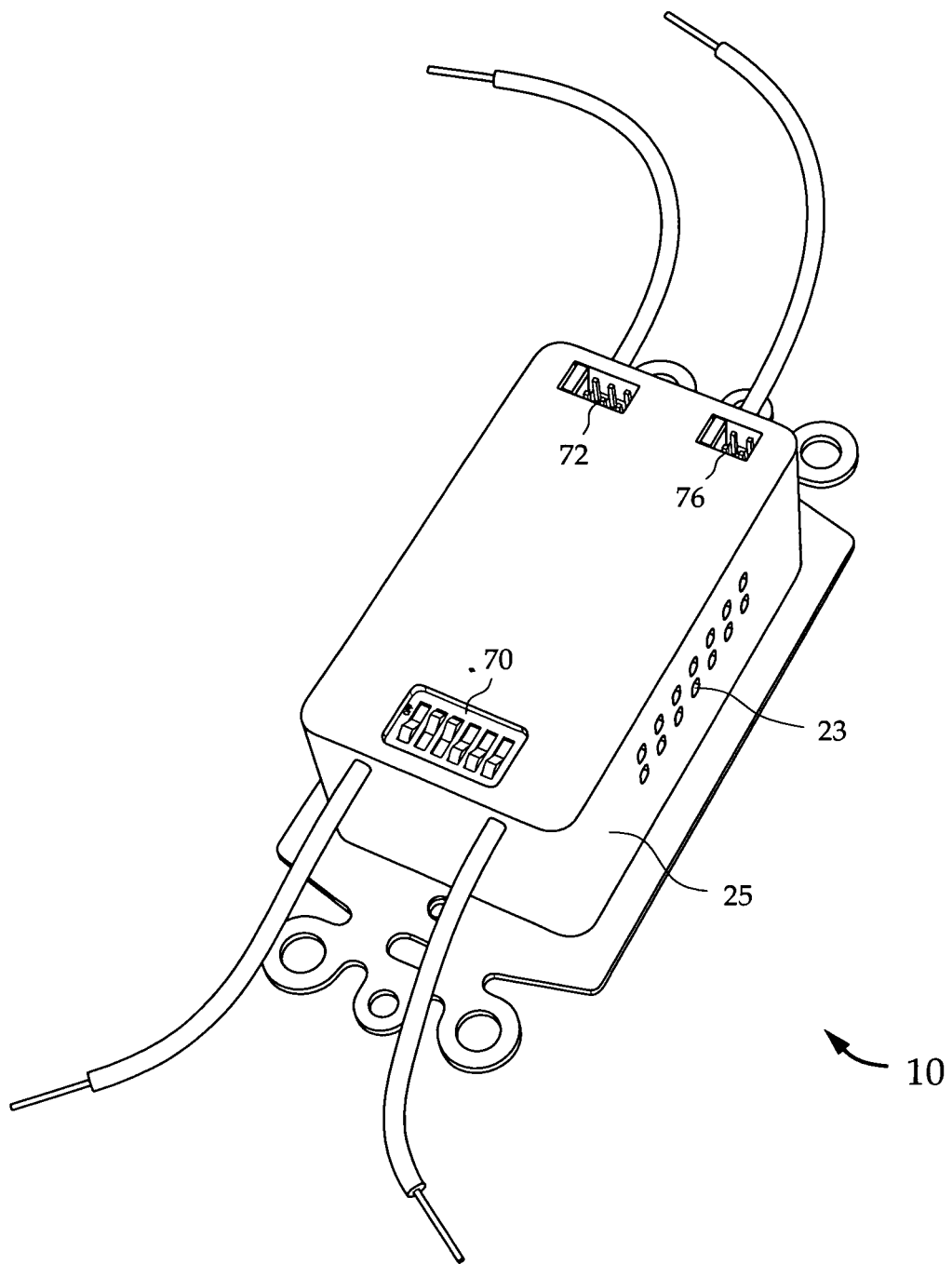
FIG. 3 further illustrates a variation of the LED driver of FIG. 2.

FIG. 3 depicts an identical LED driver 10 described in the aforementioned paragraph, but rather having the configuration control means comprising of the switch blocks 70, 72, and 76 implemented on the bottom face of the enclosure 25. The disadvantage of this arrangement is that the presetting the configuration control means can take place only when the LED driver 10 is removed from the AC outlet. This arrangement, however, also has an advantage in that the configuration control means switch blocks do not occupy any space on the faceplate 23 (FIG. 2) of the enclosure, especially when multiple functions and user control means components are to be implemented on the faceplate 23 of the LED driver 10. It is also possible to implement the configuration control means on the side faces of the enclosure 25 if doing so simplifies the printed circuit board and wirings inside the enclosure (not shown). The enclosure 25 may have one or more ventilation holes or cutouts 27 to lower the temperature of power components.

Figure 4:
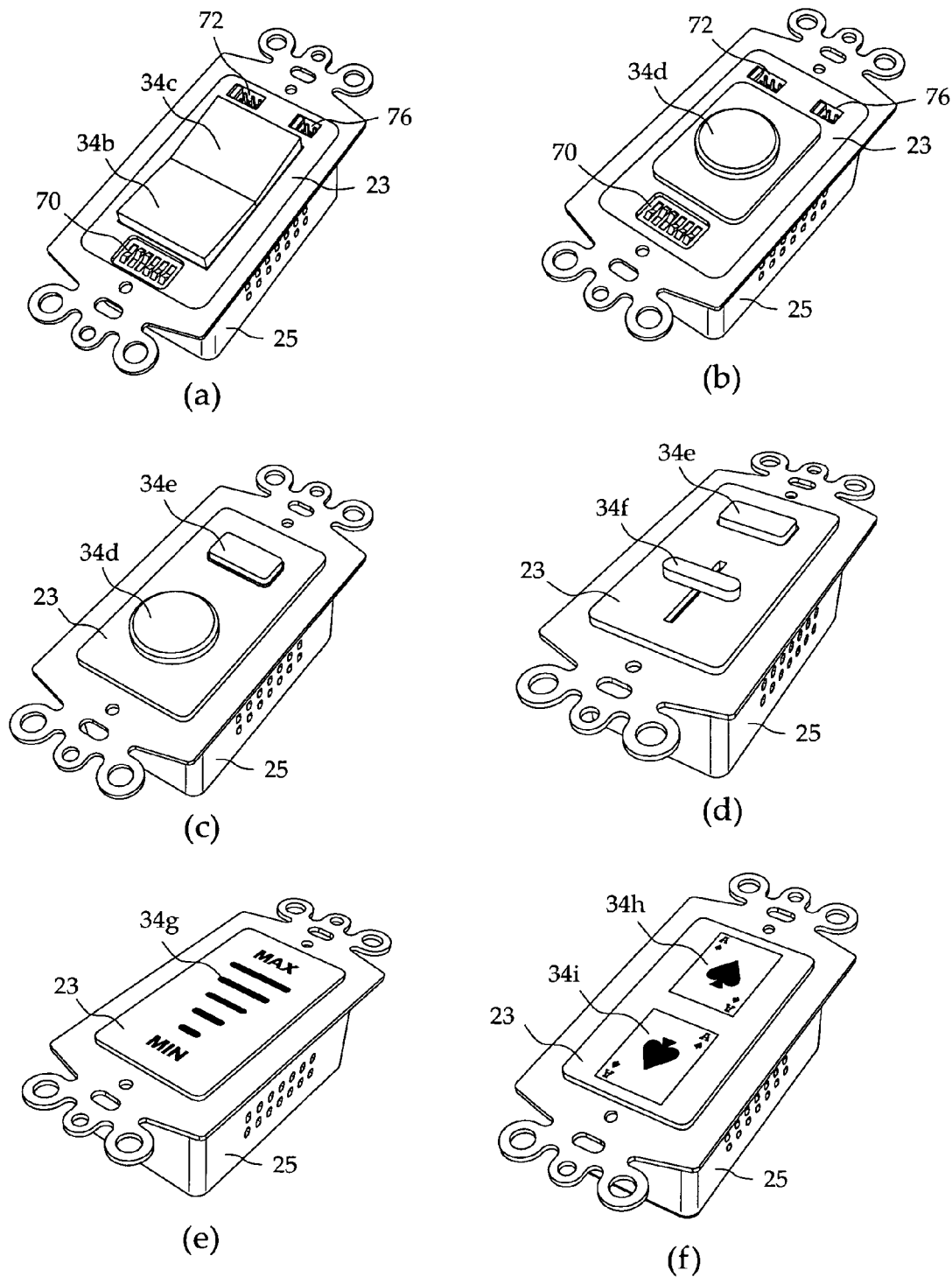
FIG. 4 illustrates additional embodiments of the LED driver of FIG. 1.

FIG. 4 illustrates six different examples of the present embodiment, in which each version uses a different type of user control means 34 for dimming and on/off. For improved clarity, the wires and wall cover plates are not shown in these illustrations. Also, the configuration control means for FIGS. 7c, 7d, 7e, and 7f are implemented on the bottom face of the LED driver, thus not shown.

FIG. 4a illustrates the LED driver having a momentary rocking panel, comprising switches 34b and 34c, on the faceplate 23. The rocking panel occupies most of the faceplate 23. Pressing 34c momentarily will turn the LEDs on, while pressing 34b momentarily will turn the LEDs off. Pressing and holding 34c will brighten the LEDs until released, while pressing and holding 34b will dim the LEDs until released. Underneath each end of the rocking panel there is a small momentary switch (not shown), which actuates when the rocking plate is pressed down on that respective end.

FIG. 4b illustrates the LED driver having a single rotary knob 34d for brightness adjustment of the LEDs. The rotary knob 34d can drive the shaft of a potentiometer or a rotary encoder. In the case of a potentiometer, the knob can turn a little less than a full rotation. When the knob is turned counterclockwise, the LEDs will dim; when the knob is turned clockwise, the LEDs will brighten. The potentiometer may have an integrated switch to turn the LEDs off, which operates at the counterclockwise extreme of rotation. There are also potentiometers available with an integrated push switch, in which a push on the knob will toggle the LEDs on or off. The advantage of a potentiometer with a push switch is that the LEDs can be turned off or on at any desired brightness level with a single push on the knob.

It is also possible that 34d (in FIG. 4b) is a compact integrated "knob potentiometer with switch" such as P16S or PA16S offered by Vishey Sfernice, Malvern, Pa., USA.

In the case that the knob is driving a rotary encoder, the knob can endlessly be turned clockwise or counterclockwise. The rotary encoder may be turned counterclockwise to dim the LEDs or turned clockwise to brighten the LEDs. To turn the LEDs off, the rotary encoder may be turned counterclockwise until the brightness of zero level is reached. Alternatively, 34d can be a rotary encoder with an integrated push switch. When the rotary encoder has an integrated push switch, the LEDs may be turned off or on at any desired brightness setting with a single push on the knob.

FIG. 4c illustrates the version of the LED driver in the aforementioned version shown in FIG. 4b, except the LEDs are turned on or off using a separate switch non-integral to the rotary knob mechanism. The rotary knob 34d drives a potentiometer or a rotary encoder to adjust the brightness of the LEDs, while the switch 34e is used to toggle the LEDs on or off. The switch 34e can be a push-button or any kind of on-off switch. Small momentary switches are preferred due to very small size, height, and very low costs. The momentary switches are typically interfaced to very low DC voltage circuits; therefore, they typically have a very long life span.

FIG. 4d illustrates a version of the LED driver similar to the version described in FIG. 4c. The potentiometer 34f in FIG. 4d is a slider type potentiometer. To dim the LEDs, the user slides the small knob downward. To brighten the LEDs, the knob is moved upward. The function of the switch 34e is to turn the LEDs on or off when pressed.

FIG. 4e illustrates the version of the LED driver where the touch-sensitive areas on the faceplate are used to adjust the brightness of the LEDs or to turn them on or off. The LED driver shown in FIG. 4e uses no mechanical switches on the faceplate; rather, touch-sensitive technologies such as capacitive touch sensors as the user control means embedded in the faceplate 23. To turn the LEDs on or off, the user gently taps on the faceplate 23, and to change the brightness of the LEDs, he/she slides a finger upward or downward on the touch-sensitive area 34g. Alternatively, the touch-sensitive area may consist of one or more touch zones for dedicated tasks. For example, there may be a touch zone for turning the LEDs on, a touch zone for turning the LEDs off, and a touch zone for brightness control.

The capacitive touch area embedded in faceplate 23 (FIG. 4e) is rugged, resilient, and it is the ideal LED driver faceplate for medical, industrial, and outdoor environments because the faceplate is completely seamless. As the result, the LED driver may be used in explosive gas environments, and in areas where the faceplate 23 is exposed to water and other liquids. The faceplate may be made of materials that can easily be wiped using disinfectants in medical environments. Additionally, any kind of artwork, text, signs, logos, advertisement, or graphics may be laminated under the faceplate. For instance, FIG. 4f, shows two playing cards, 34h and 34i, used as touch sensitive areas for turning the LEDs on-off, or if desired, dimming/brightening them.

Figure 8:
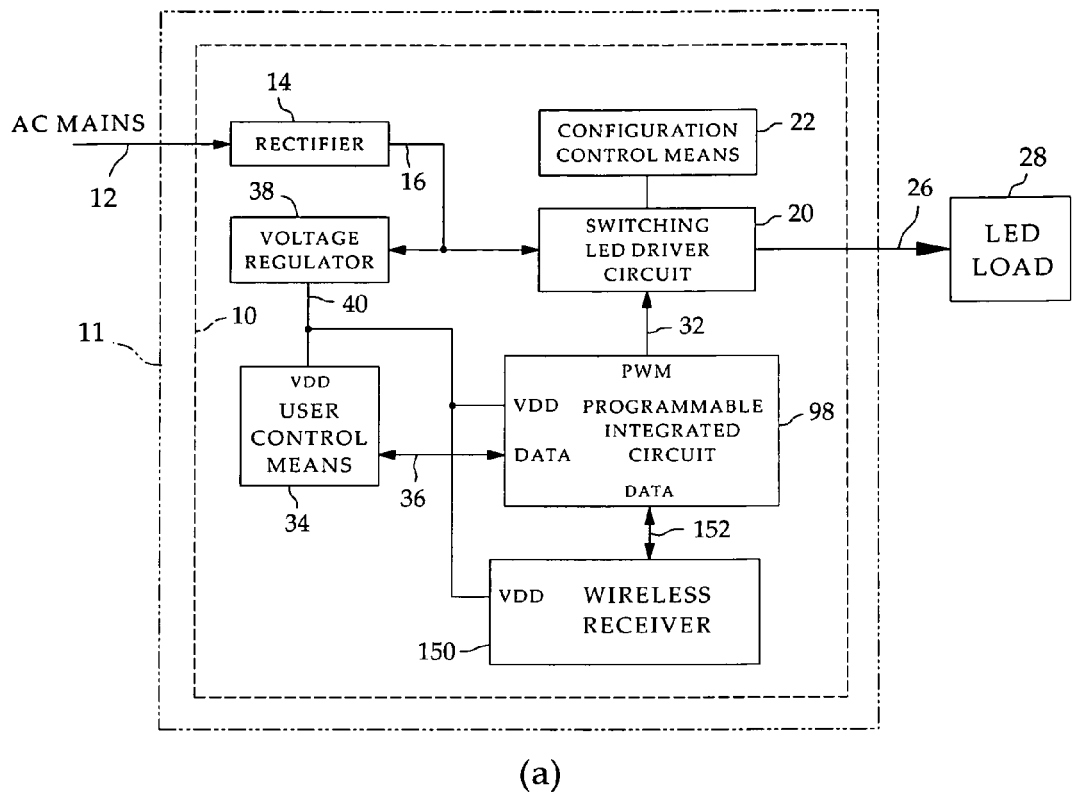
Figure 8:
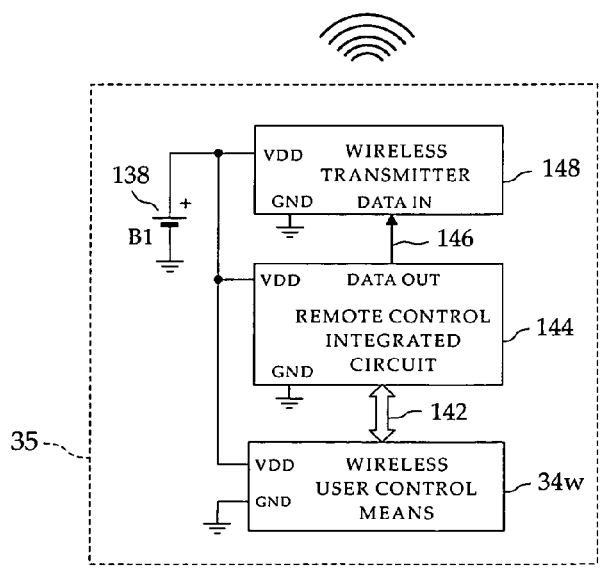

FIG. 8a is the block diagram of another embodiment of the present invention, wherein the functions of the LED driver 10 are controlled wirelessly via a remote controller 35 (FIG. 8b). The output voltage and/or output current of the LED driver 10 can be configured using configuration control means 22. The LED driver 10 comprises a wireless receiver 150, which receives control data transmitted by the remote controller 35. The received control data is transmitted to a programmable integrated circuit 98 via the leads 152. The programmable integrated circuit 98 decodes and processes the received data and adjusts the duty cycle of the PWM accordingly. The PWM signal is sent to the switching LED driver 20 via the lead 32. The voltage regulator 38 is preferably an offline voltage regulator that generates a small DC voltage to power the wireless receiver 150, programmable integrated circuit 98, and the user control means 34.

Although the functions of the present embodiment are controlled wirelessly using the remote controller 35, an optional user control means 34 may be installed in the faceplate of the LED driver 10 to control the functions of the LED driver 10 if the remote controller 35 is missing.

The remote controller 35, illustrated in FIG. 8b, comprises a wireless user control means 34w, a programmable integrated circuit 144, and a wireless transmitter 148. The wireless user control means 34w transmits the user input, such as a switch closure, to the programmable integrated circuit 144 via the leads 142. The programmable integrated circuit 144 encodes the user input into control data suitable for wireless transmission and sends the control data to wireless transmitter 148 via the leads 146, which broadcasts the control data.

Figure 9:
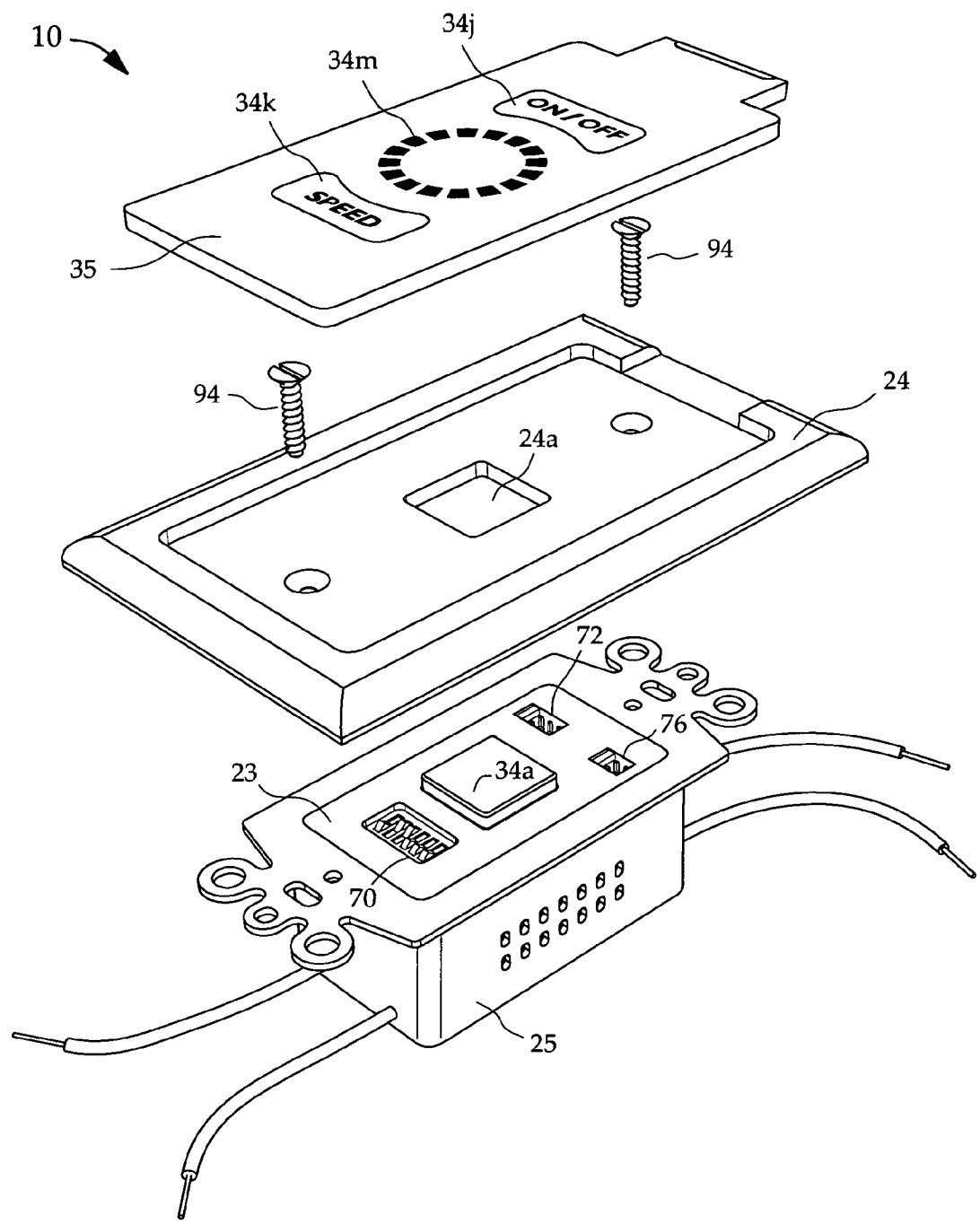
FIG. 9 illustrates an exploded view of the wireless embodiment of the LED driver of FIG. 1.

FIG. 9 illustrates the exploded view of the LED driver 10 with a remote controller 35, in which the remote controller 35 is detachable from the wall cover plate 24 of the LED driver 10. The remote controller 35 is held on the wall cover plate 24 using one or more small magnets (not shown) embedded in the wall cover plate 24 and also in the bottom surface of wireless controller 35. Force of attraction between magnets holds the wireless controller 35 within the wall cover plate 24.

In FIG. 9, the configuration control means is comprised of the switch blocks 70, 72, and 76, which are implemented in the faceplate 23. The wall cover plate 24 is held using the screws 94 on the LED driver and conceals the switch blocks 70, 72, and 76 and makes them relatively inaccessible during normal operation of the LED driver.

The user control means includes a switch 34a for turning the LEDs on or off, or dim them if desired. The switch 34a is relatively accessible through the cutout 24a in the wall cover plate 24.

The wireless user control means includes an on/off control 34j for turning the LEDs on or off, a touch wheel 34m for dimming/brightening the LEDs, and a speed control 34k for adjusting the rate of dimming/brightening.

The wireless user control means 34j, 34k, and 34m, implemented in the wireless remote controller 35, preferably use capacitive touch technology. The use of touch zones and related integrated circuits has many advantages as opposed to the use of mechanical switches. A remote controller using capacitive touch circuits is thin, lightweight, durable, low power, sensitive, immune to high noise levels, splash-proof, inexpensive, and attractive, along with typically having a low component count. More importantly, the capacitive touch pad circuits have a very long life span since the controls are non-mechanical. Additionally, employing the capacitive touch zone enables the use of various graphics that may be laminated under the top surface of the remote controller.

The touch wheel 34m includes several small touch zones in a circular pattern. The user slides his/her fingertip on the circular pattern of 34m in a counterclockwise direction to dim the LEDs until the desired brightness level is reached. The user slides his/her fingertip in a clockwise direction to brighten the LEDs until the desired brightness level is reached. It is possible to use other artwork and geometric patterns for the touch zones.

The wireless remote controller 35 may incorporate any kind of wireless platform for wireless communication with the LED driver such as radio frequency (RF) (similar to the keyless car entry RF controllers) or infrared (IR). The use of ultrasonic communication for remote controllers is also possible but less desirable due to the large size of components, higher power consumption, and short control range. It should be noted, however, that the infrared platform requires use of infrared LED(s) on the remote controller and use of infrared detectors on the LED driver (not shown).

When using a radio frequency (RF) in the wireless remote controller, the user does not need to "point" the wireless controller 35 at the LED driver. As a result, control is possible from adjacent rooms, as the radio waves can pass through furniture and walls regardless of the orientation of the remote controller, as opposed to an almost unidirectional control for IR wireless remote controllers.

The remote controller 35 may be powered using any type of small primary or secondary cells; alternatively, the remote controller 35 may use inductive coupling technology to charge an onboard rechargeable battery or a super capacitor. Typically, a remote controller for a lighting fixture is not used very often; therefore, a button cell or coin cell battery is the simplest and cheapest way to power the remote controller.

Figure 10:
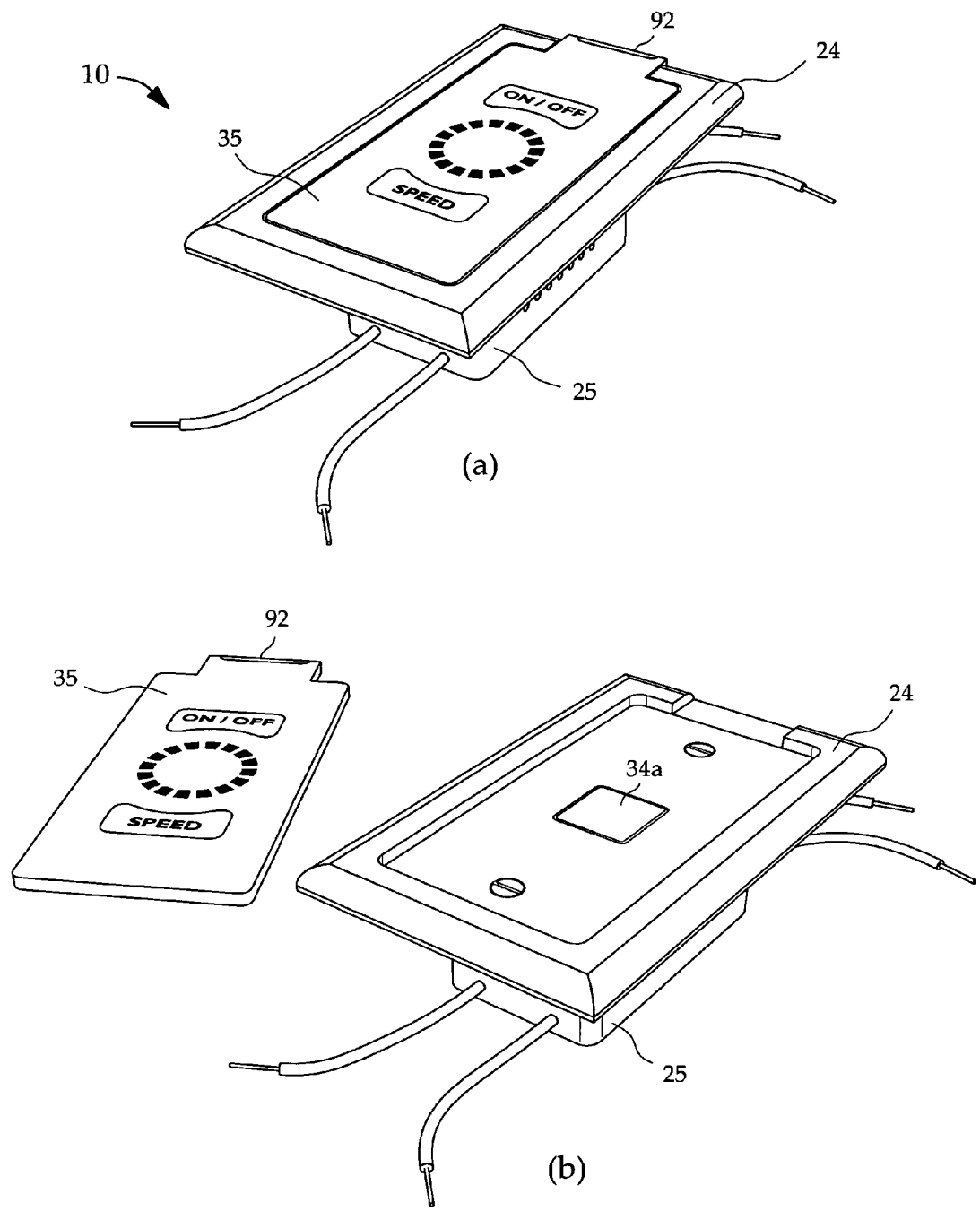
FIG. 10a illustrates the overall appearance of the wireless embodiment of the LED driver of FIG. 1.
FIG. 10b further illustrates the overall appearance of the wireless embodiment with the remote controller removed from its compartment on the LED driver.

FIG. 10a shows the overall appearance of the wireless embodiment. The tab 92 at one end of the wireless controller 35 allows an end user to easily lift or separate the wireless controller 35 from the wall cover plate 24 as shown in FIG. 10b. Alternatively, the wall cover plate 24 may have a provision such that the wireless controller 35 "snaps" in the wall cover plate 24. FIG. 10b shows the remote controller 35 removed from its compartment on the wall cover plate 24 of the LED driver.

In another embodiment of the present invention, two or more LED drivers may be packaged into one enclosure to install into a ganged outlet box for controlling two or more LED lighting loads. While it is possible to install two or more independent LED drivers in a gang box, this embodiment is particularly important because it saves enclosure space, reduces component count, and lowers the overall cost of a multi-driver installation. In the ganged operation, the LED drivers can share several of the components. For example, the enclosure, heat sink, printed circuit board, and some electronic components can be shared by two or more LED drivers.

Figure 11:
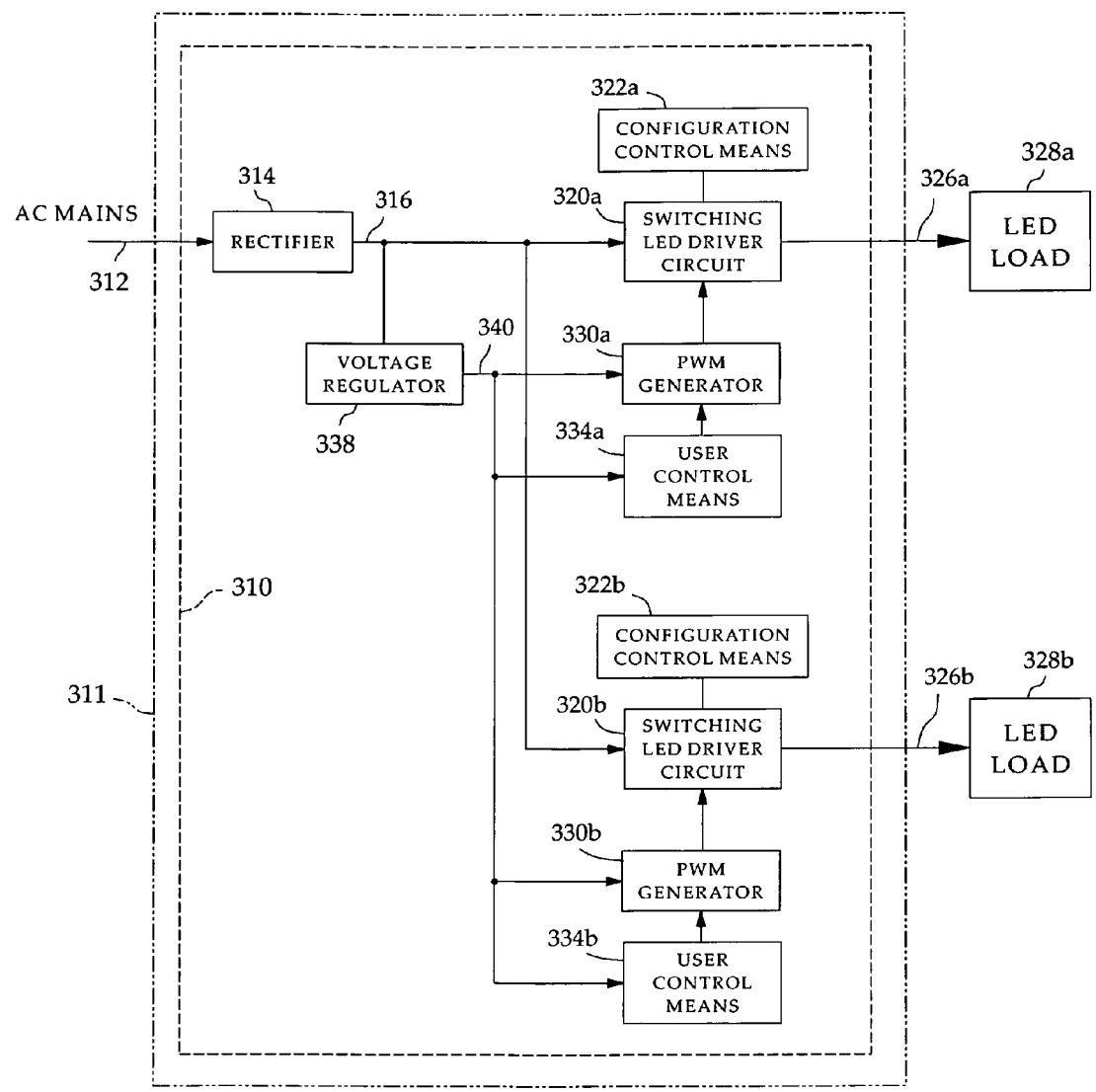
FIG. 11 illustrates the block diagram of a dual LED driver suitable for installation in a dual-ganged AC outlet box.

Referring to FIG. 11, the block diagram of this embodiment is shown for a 2-gang LED driver assembly. The principles of FIG. 11 can be applied to a three or more gang LED driver assembly. The overall operation, control, and dimming is similar to the operation of a single independent LED driver. The 2-gang LED driver is installed in a ganged AC outlet box 311. The entire unit gets its power from the AC mains' wires 312 inside the AC outlet box 311. The mains' alternating current is rectified and filtered by the rectifier module 314. Although it is possible to employ two separate rectifiers for the rectifier module 314, it is advantageous to use a single rectifier circuit having a higher power rating to save space in the enclosure of the LED driver and to reduce component cost. The rectified output 316 is applied to two switching LED driver circuits 320a and 320b. The first switching LED driver circuit 320a powers the first LED load 328a via leads 326a, while the second switching LED driver circuit 320b powers the second LED load 328b via leads 326b.

The first configuration control means 322a configures the output voltage and/or current for the first switching LED driver circuit 320a, and the second configuration control means 322b configures the output voltage and/or current for the second switching LED driver circuit 320b.

Also, the first user control means 334a is used to control the duty cycle of the PWM generated by the first PWM generator 330a, and the second user control means 334b is used to adjust the duty cycle of the PWM generated by the second PWM generator 330b.

The supply voltage for the user control means (334a, and 334b) and for the PWM generators (330a, and 330b) is provided in lead 340 by the low DC voltage provided by the voltage regulator 338. It should be noted that the switching LED driver circuits 320a and 320b may include onboard voltage regulators to supply power to the user control means and PWM generators (not shown).

It is possible to employ a single integrated circuit composed of two switching LED driver circuits 320a and 320b. It is also possible to design one PWM generator circuit that generates two independent PWM signals; for instance, two caption-compare registers onboard a microcontroller can be used to generate two independent PWM signals controlled by two independent GPIO pins of the microcontroller.

It is important to note that it is possible to install only one LED driver in a gang box to take advantage of the extra space available in a gang box. For example, to power large lighting fixtures and fixtures used in industrial applications, a higher power LED driver may be necessary that may not fit in a single standard AC outlet box. For such an application, it may be necessary to employ components having higher power rating, or it may be necessary to provide a larger heat-sink to lower the temperature of power components. It may also be necessary to use many of the disclosed functions or embodiments of this invention in a single LED driver assembly. A faceplate for a gang box can accommodate many more user interface components than a faceplate for a single outlet; as the result, the user interface will look more appealing and less cluttered. For high power applications, a power factor correction circuit (not shown) may be implemented at the output of the rectifier circuit 314 to increase the power factor.

Figure 12:
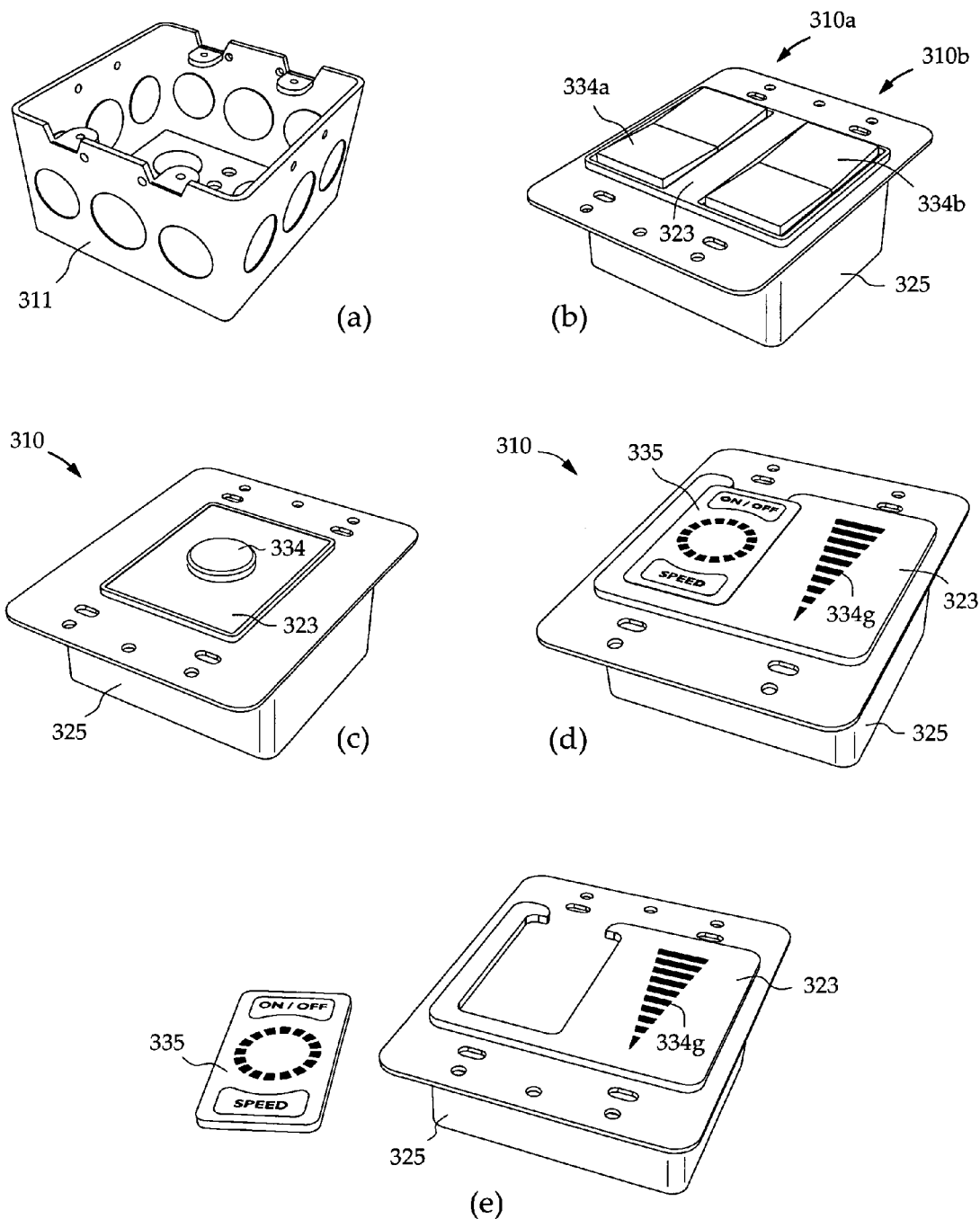
FIG. 12a is an illustration of a 2-gang AC outlet box.
FIG. 12b shows a dual-LED driver that can fit in a 2-gang AC outlet box.
FIG. 12c is a single high-power LED driver packaged in a larger enclosure to fit in a 2-gang AC outlet box.
FIG. 12d is a single high-power LED driver packaged in a larger enclosure to fit in a 2-gang AC outlet box, comprised of a local user interface as well as a detachable wireless remote controller.
FIG. 12e illustrates the embodiment shown in FIG. 12d, with the remote controller removed from its compartment.

FIG. 12 illustrates the overall appearance of the embodiment of FIG. 11. To reduce the clutter in the illustration, the input wires, output wires, ground wires, configuration switches, and wall cover plates are not shown. FIG. 12a shows a metallic 2-gang ac outlet box 311, which is commonly used for housing electrical switches and receptacles in walls. Various shapes of gang boxes are available, made of various materials for various installations. In general, the volume and mounting tabs of a gang box are such that standard switches and receptacles can be attached to them while leaving enough space for joining wires. External single and multi-gang AC outlet boxes are also available and can house single and multiple LED drivers of the present invention. External AC outlet boxes are installed on the surface of walls.

FIG. 12b illustrates a dual LED driver that employs a single enclosure 325 that houses all the components of two LED drivers 310a and 310b. The faceplate 323 includes the first user interface 334a for controlling the functions of the first LED driver 310a, and the second user interface 334b for controlling the functions of the second LED driver 310b. The user control means may include other interface components to control the functions of the LED drivers 310a and 310b.

FIG. 12c illustrates a single LED driver 310 housed in a larger enclosure 325 suitable for installing in a dual-gang outlet box. The faceplate 323 includes a user interface 334 for controlling the brightness of LEDs and turning them on/off.

FIG. 12d illustrates a single LED driver 310 occupying a larger enclosure 25 that is suitable for installation in a 2-gang outlet box. The enclosure 325 typically has a volume twice that of an enclosure for a single outlet box. Accordingly, the faceplate 323 is typically two times larger than a faceplate that covers an enclosure intended for installation in a single outlet box. As a result, the faceplate 323 provides sufficient space for many user interface components. In the example shown in FIG. 12d, the faceplate 323 includes a compartment for a small wireless remote controller 335. The touch slider 334g is implemented on the non-detachable part of the faceplate 323. Therefore, in the example shown, the faceplate is partially removable. It is quite possible that two or more remote controllers 335 could fit on the same faceplate.

FIG. 12e shows the remote controller 335 detached from the LED driver.

In another embodiment (FIG. 13) of the present invention, the functions of the LED driver are controlled using a smartphone, tablet, notebook computer, laptop, or other computing platforms. The use of mobile devices or computing platforms for wireless control of the LED driver adds extra versatility to the functionality of the LED driver. Such devices are powerful programmable devices that have excellent and user friendly interfaces.

The mobile devices or computing platforms can use Bluetooth or Wi-Fi connectivity hardware and software. Bluetooth and Wi-Fi are two different technologies that are extensively used in mobile applications and computing platforms. While both technologies are used for local and global wireless remote control applications, their practical uses are different. Wi-Fi allows devices such as a smartphone, tablets, and computing platforms to connect to a local area network (LAN), while Bluetooth allows connections between individual devices; for example, between a smartphone and a headset unit. Therefore, Bluetooth does not connect a device to a LAN. Although both Wi-Fi and Bluetooth have short communication ranges, Wi-Fi provides wider coverage than Bluetooth, because Wi-Fi can connect to the Internet via a LAN. The main purpose of Bluetooth is to eliminate the need for any cable connections between two devices, while the main purpose of Wi-Fi is to connect to a network resource such as the Internet.

Therefore, when a Bluetooth or a Wi-Fi module is integrated with the LED driver of the present invention, the functions of the disclosed LED driver can be controlled locally or globally.

Figure 13:
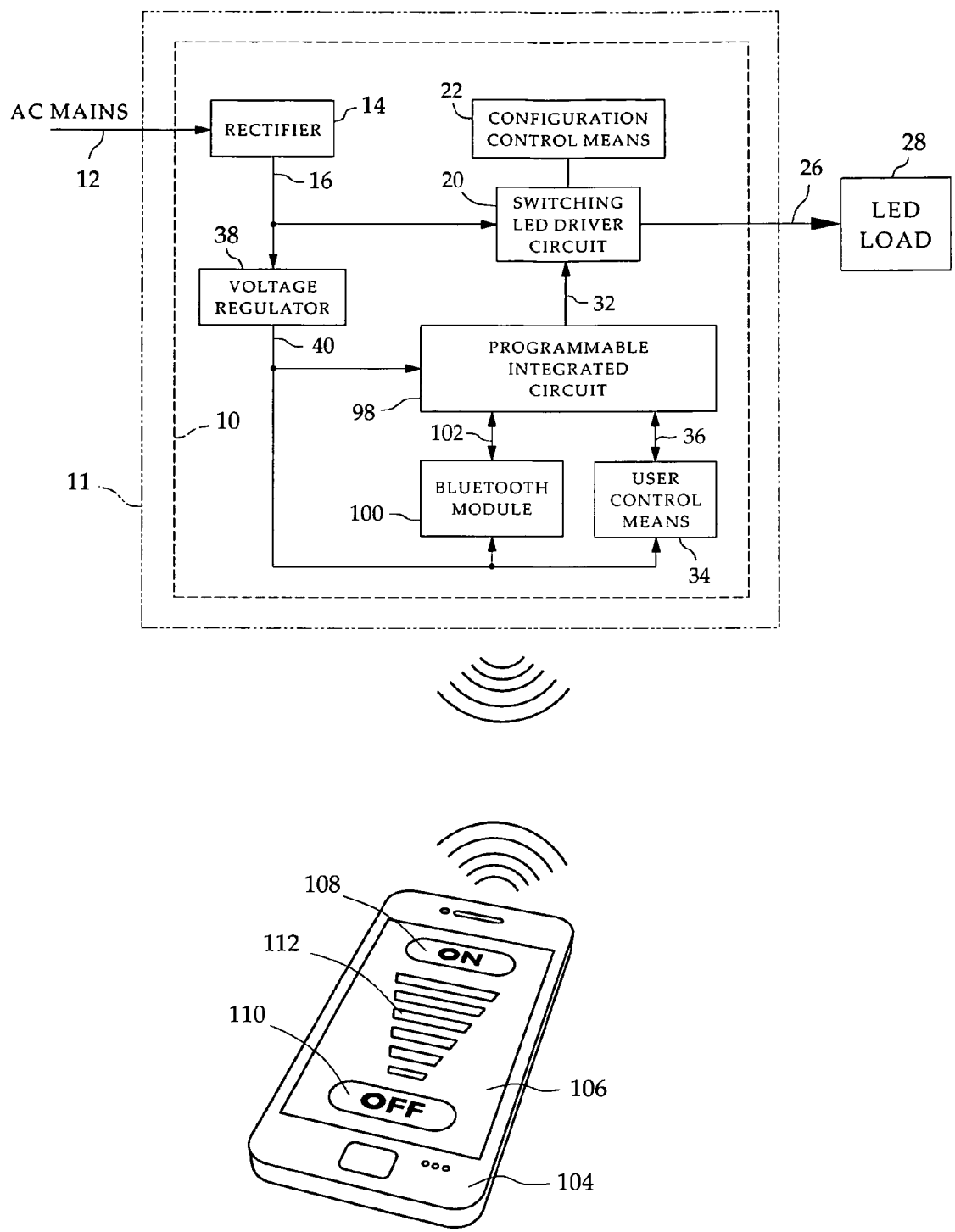
FIG. 13 illustrates the Bluetooth operation of the LED driver using an exemplary smartphone.

FIG. 13 is a block diagram of an embodiment, in which the functions of the LED driver 10 are controlled locally via user control means 34, and/or wirelessly using an exemplary smart phone 104.

In FIG. 13, the smartphone 104 is used as a wireless Bluetooth remote controller to control the functions of the LED driver 10. The entire LED driver 10 is installed in an AC outlet 11 and connects to the live and neutral wires inside the outlet via leads 12. The rectifier 14 converts the mains AC current into DC current and filters it. The output of the rectifier is directly applied to the switching LED driver circuit 20 via leads 16. The output of the LED driver circuit 20 is connected to the LED load 28 via leads 26. Leads 26 are normally run in a wall conduit. An external offline voltage regulator 38 generates a low regulated DC voltage 40 at a sufficient current to power the programmable integrated circuit 98, user control means 34, and Bluetooth module 100.

The smartphone 104 is used as an example to describe the present embodiment. Other smart devices such as a tablet, notebook computer, laptop, or computing platform can be employed as well. In this example, the smartphone 104 has an exemplary graphical user interface (GUI), which includes an ON touch button 108, OFF touch button 110, and brightness adjustment touch slider 112 for controlling the functions of the LED driver 10. It is important to note that the GUI in this example is a user-friendly way for humans to interact with the smartphone 104 and refers to any shapes, icons, menus, windows on the LCD display 106 of the smartphone that can be manipulated by the tip of a finger or by a stylus for a very convenient interaction with the smartphone 104.

In response to actuation of touch buttons 108, 110, or 112, the smartphone 104 transmits RF control signals that are received by the Bluetooth module 100. The Bluetooth module 100 has an onboard antenna (not shown). The Bluetooth module 100 serially communicates the received control data via interface lines 102 with programmable integrated circuit 98. The programmable integrated circuit 98 decodes and processes the received data and accordingly adjusts the duty cycle of the PWM signal or turns the PWM signal ON/OFF. The PWM signal is transmitted to the switching LED driver circuit 20 via the lead 32, which adjusts the brightness of the LEDs 28 or turns them ON/OFF.

In a similar manner that is described in the aforementioned paragraph, the programmable integrated circuit 98 is programmed to detect the actuation of one or more keys employed in the user control means 34 via interface lines 36. In response to such actuations, the programmable integrated circuit 98 decodes and processes the received data and accordingly adjusts the duty cycle of the PWM signal or turns the PWM signal ON/OFF. The PWM signal is transmitted to the switching LED driver circuit 20 via the lead 32, which adjusts the brightness of the LEDs 28 or turns them ON/OFF.

Other icons to control the functions of the LED driver 10 may also be incorporated into the GUI of the smartphone 104. For example, a delayed turn-off, random on/off, or scheduled on/off can be incorporated on the same GUI page or on a different GUI page. The programmable integrated circuit 98 is accordingly programmed to recognize, decode, and process all corresponding control data received by the Bluetooth module 100.

The GUI may also include query buttons (not shown) to obtain the status of the LED driver 10. In response to a query, the programmable integrated circuit 98 sends the present ON/OFF or dimming status data to the Bluetooth module 100 via the interface lines 102. The Bluetooth module 100 transmits the corresponding RF signals, which is received and displayed by the smartphone 104. The query is particularly important in this embodiment, because the LED driver 10 can be controlled from a distant location where it may not be possible to see the LED load 28.

The programmable integrated circuit 98 is any type of programmable integrated circuit such as a microcontroller, microprocessor, signal controller, PSoC (programmable system on chip), or ASIC.

Figure 14:
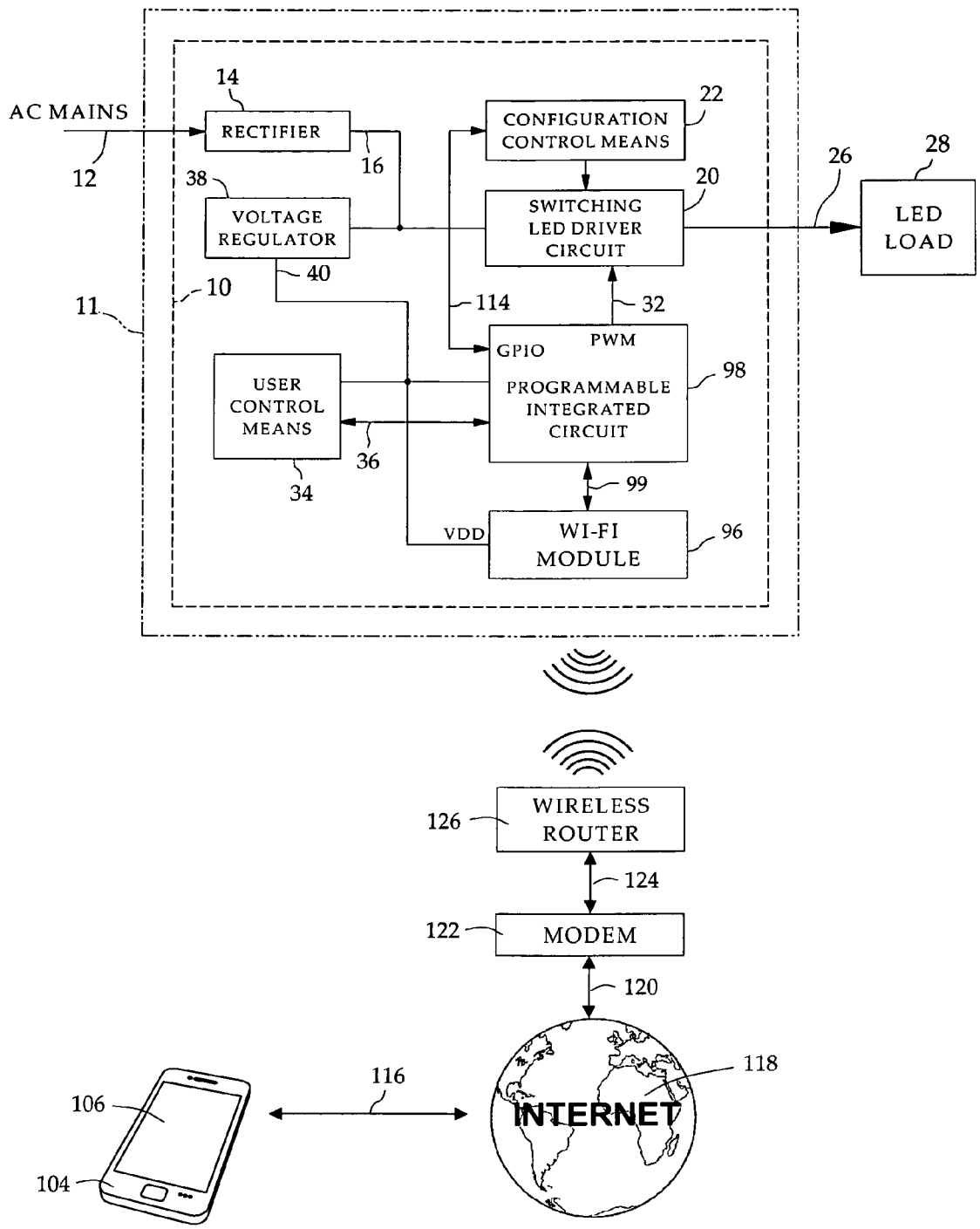
FIG. 14 shows the block diagram of an embodiment of the LED driver, in which the LED driver can globally be controlled using an exemplary smartphone.

The block diagram in FIG. 14 illustrates the LED driver 10, which can globally be controlled by smartphones, tablets, notebooks, or other internet enabled computing platforms. Therefore, the LED driver 10 becomes part of the great number of devices, or "things", that are controlled using the Internet. Such a network is called "Internet of Things" or "IoT".

Currently, great numbers of computers and devices around the world exchange information using the global network of the Internet. The Internet has two main components: a) The hardware, and b) the protocols. The hardware includes all the physical devices and components that enable transmission/reception of data that need to be transferred from one point to another. For example, the hardware includes servers (i.e. computers that store the information that clients can access), end points (e.g. the computer that clients use), routers (i.e. the devices that pass data between a server and the client), modems (i.e. devices that enable transmission of digital data over analog telephone lines), and means to carry the data (i.e. the cables, radios, satellites, etc).

The protocols are simply sets of rules that form a 'common language' that the computers must follow so that they can communicate with each other. Without Protocols, the computers connected to the Internet will not understand each other and thus they will not be able to communicate.

The two most important protocols that set the rules for flow of the information through the Internet are 'Transmission Control Protocol' or TCP, and 'Internet Protocol' or IP. The two protocols together are called TCP/IP, which specify how data should be formatted, addressed, transmitted, routed, and received at the destination. TCP is responsible for orderly, correct, and error-checked transmission of data from host to host, while IP is responsible for delivering data from host to host. Also, just the way a letter is mailed from one mailing address to another mailing address, each end point must have an IP address. That way, a computer can connect to another computer within the vast network of computers. The destination address is included in the IP packet.

The application software for controlling the LED driver 10 is installed in the exemplary smartphone 104. The smartphone 104 is an Internet-enabled device, so that it can wirelessly connect to the global network of Internet 118 using mobile wireless Internet access 116. The mobile wireless Internet access 116 is a service that is usually provided by a cellular company to its subscribers. The high-speed routers used within the global network of Internet 118 direct the TCP/IP packets of information sent from the smartphone 104 to the destination IP address in the remote location 120. This IP address is called an 'external IP address', which the Internet Service Provider "ISP" assigns to the subscriber's end point. The modem 122 recovers the packets of TCP/IP data from the analog line and provides them to the wireless router 126.

The wireless router 126 is a "gateway" between the external global network of Internet 118 and one or more local wireless devices, such as the Wi-Fi enabled LED driver 10 disclosed herein. All the local wireless devices that interact with the "gateway" establish a local area network LAN. In order for the wireless router 126 to route the TCP/IP packets of data to the intended device within the wireless LAN, a unique "local IP address" is assigned to each device within the LAN.

The TCP/IP packets of data that contain the control instructions sent by the smartphone 104 are routed to a Wi-Fi module 96, interfaced to the programmable integrated circuit 98 via interface lines 99. The Wi-Fi module has preferably an integrated or PCB antenna (not shown).

The programmable integrated circuit 98 decodes and processes the received instructions and accordingly adjusts the duty cycle of the PWM signal that is transmitted in the lead 32 to the switching LED driver circuit 20 to adjust the brightness of the LED load 28, or turn it ON/OFF.

The instructions received from the smartphone 104 can include other control functions. For example, the instructions may include random on/off, delayed time-off, scheduled on/off, or adjustments of the duty cycle according to the time of the day. In response to such instructions, the programmable integrated circuit 98 takes the corresponding action. In a similar manner, the programmable integrated circuit 98 can send TCP/IP packets of data to the smartphone 104 via the Wi-Fi module 96 to indicate the status of the LED load 28.

The disclosed Wi-Fi enabled LED driver 10 can also exchange TCP/IP packets with other Wi-Fi devices within the local area network.

In addition to being wirelessly controlled from a remote location, the LED driver 10 is controllable via user control interface 34 implemented on the faceplate of the LED driver 10. For instance, the Wi-Fi enabled LED driver may include user interface components similar to the components described in (FIG. 4).

In an important aspect of the present invention, the programmable integrated circuit 98 can compute the exact amount of energy consumed by the LED load 28 based on the output current, output voltage, the duty cycle of the PWM, and the duration of the time the LED load 28 was ON. The computed energy consumption can be transmitted to the exemplary remote smartphone 104, a local computing platform in the LAN (not shown), or the website of the power company. Such "energy monitoring" will provide valuable information about local or national energy usage and peak consumption periods.

It is obvious that more than one LED driver 10 can be installed within a LAN, in which case, the smartphone 104 can control the entire LED loads used in a LAN. As the result, the present invention is a valuable technology for home/industrial automation.

Figure 15:
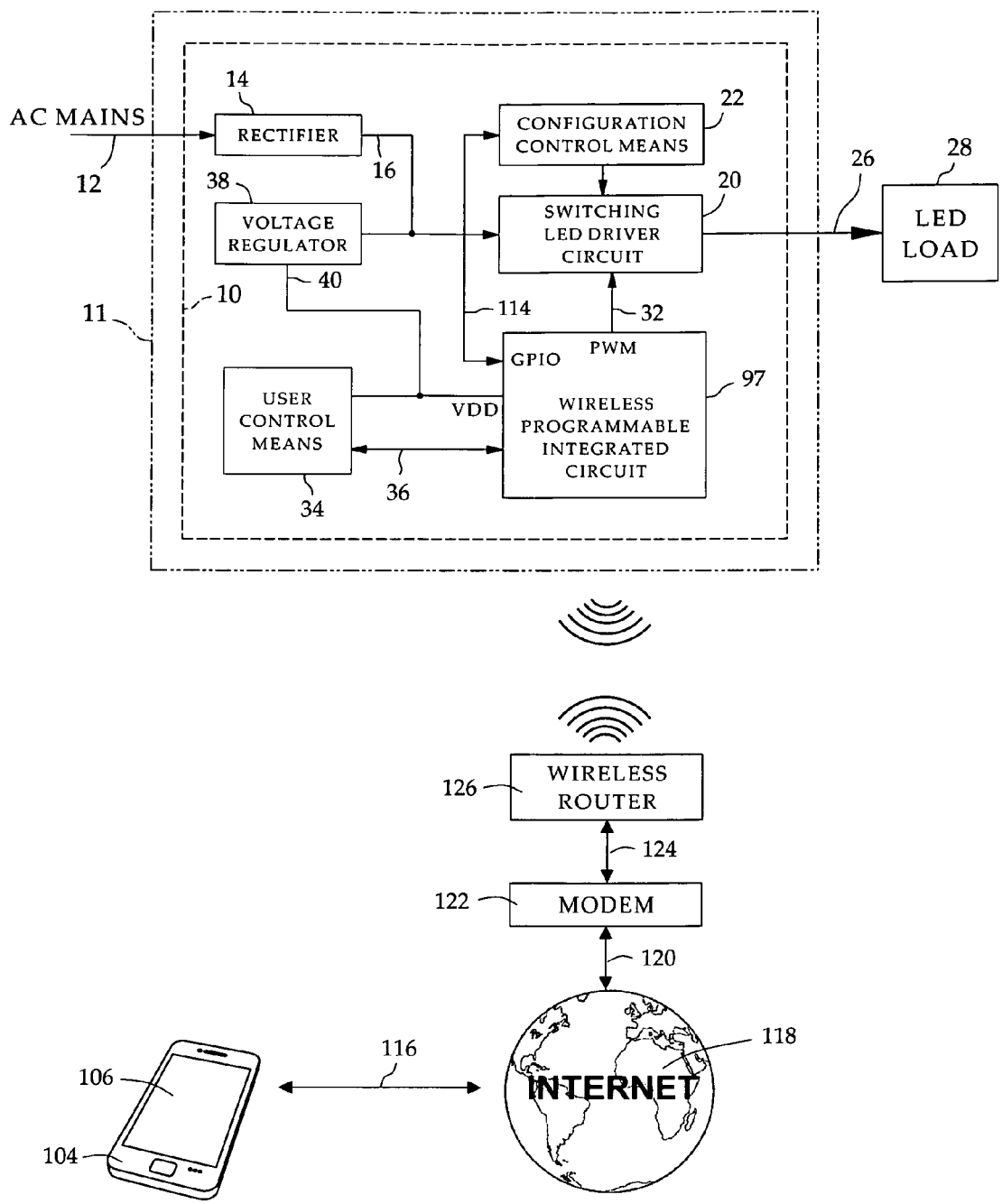
FIG. 15 illustrates the application of a wireless programmable integrated circuit in the block diagram of FIG. 14.

To reduce the component count and costs, it is possible to employ a programmable integrated circuit with integrated Wi-Fi transceiver to replace 96 and 98 in FIG. 14. Referring to FIG. 15, the wireless programmable integrated circuit 97 combines the functionality of a Wi-Fi transceiver 96, and a programmable integrated circuit 98 into a single package 97.

The Wi-Fi module in circuit 97 is preferably a Wi-Fi module with embedded programmable integrated circuit. For example, the JN516X series of microcontrollers from NXP Semiconductors, Eindhoven, Netherlands, is a series of ultra-low power, high performance wireless microcontrollers that are suitable for this embodiment. The JN516X microcontrollers include a 32-bit RISC processor with embedded flash and EEPROM memory and programmable clock speeds. They also include a 2.4 GHz IEEE802.15.4 compliant transceiver and a comprehensive mix of analog and digital peripherals. These peripherals can be employed to generate a PWM signal, sense switch closures, and interface to other integrated circuits via a serial or parallel interface. These microcontrollers can also support a switch matrix for capacitive touch pads. The JN516X microcontrollers consume a low current of only 15 mA during operation.

The Wi-Fi enabled LED driver 10, shown in FIG. 15, fits inside an AC outlet 11 and directly connects to the AC mains via leads 12. The rectifier 14 converts the mains AC current into DC current and filters it. The output of the rectifier 14 is applied to the switching LED driver circuit 20 via the leads 16. The output of the switching LED driver circuit 20 is connected to the LED load 28 via the leads 26. Leads 26 normally run in a wall conduit. An external offline voltage regulator 38 generates a low regulated DC voltage 40 at a sufficient current to power the wireless programmable integrated circuit 97, and user control means 34.

The LED driver 10 is configurable for a desired voltage and/or current to match the LED load 28. As described in the preceding paragraphs, configuring the output voltage and/or current of the LED driver 10 can be accomplished using switch blocks in the configuration control means 22. Alternatively, semiconductor switches may be employed in the configuration control means 22, which are preset to ON or OFF by the wireless programmable integrated circuit via signals from GPIO lines 114, to be described.

Figure 16:
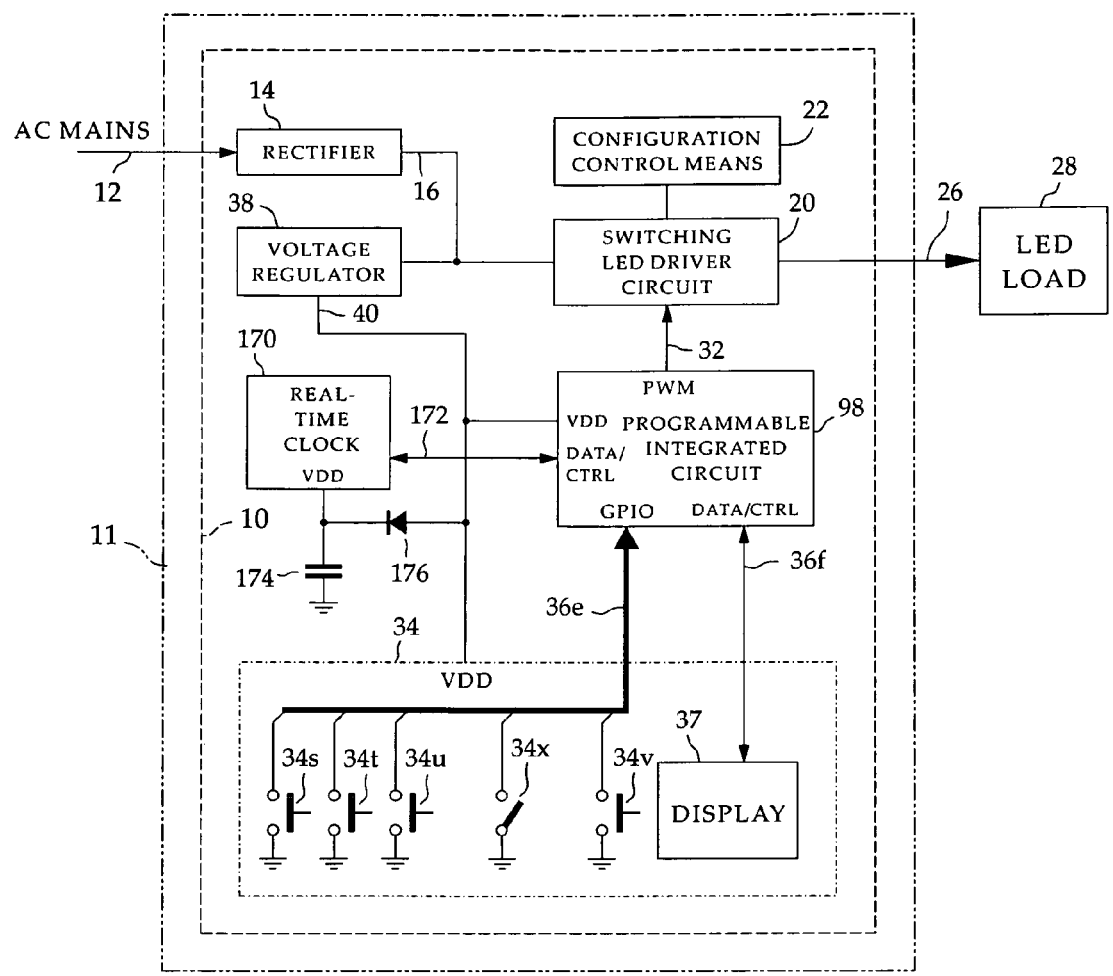
FIG. 16 shows a programmable LED driver to operate according to daily or weekly tasks, where the brightness level is also programmable.

FIG. 16 depicts the block diagram of another embodiment of the LED driver 10, which is programmable for automatic daily or weekly operation of the LED load 28. The automatic operation of the LED driver 10 is particularly useful in work places, schools, shops, etc. The LED driver 10 can be programmed to turn on/off at exact prescribed times and at desired brightness.

The LED driver 10 includes a real-time clock 170, super capacitor 174, diode 176, programmable integrated circuit 98, and user control means 34. The real-time clock keeps track or the real-time (i.e. current time). The super capacitor 174 functions as the battery backup for the real-time clock 170 to continue to keep track of the current time during a power outage. The super capacitor 174 is fully charged during normal operation of the LED driver 10 via the diode 176. The diode 176 prevents the reverse flow of electric current from the super capacitor 174 to the lead 40 to prolong the power backup during extended electricity outage.

The user control means is comprised of switches for controlling the functions of the LED driver 10 and a display 37 for echoing the user data and status of the LED driver. The exemplary switches 34s, 34t, and 34u are used to program the on-time an off-time events. The switch 34x is used to override the automatic operation of the LED driver 10, and the switch 34v is used to operate the LED load 28 on/off or dim it during the override.

The programmable integrated circuit 98 can be programmed in many different ways to input the timing data via the switches in the user control means and to display the status of the LED driver 10. For instance, the programmable integrated circuit 98 can be programmed such that it triggers an interrupt to show a menu on the display 37 when a user presses and holds the "menu" switch 34s. Then pressing the "up" switch 34t or "down" switch 34u allows the user to move a cursor up or down between the menu items. Momentary pressing of the menu switch 34s will select the menu item pointed to by the cursor. The menu may include items for setting the current time and date, days of the week, time to turn on the LED load 28, time to turn off the LED load 28, duty cycle of the PWM (to set the brightness), etc.

The five switches 34s, 34t, 34u, 34x, and 34v are interfaced to five general purpose input/output (GPIO) pins of the programmable integrated circuit 98 via the leads 36e. The display 37 can be any kind of alphanumeric or graphical LCD or LED display. The display 37 is interfaced to the programmable integrated circuit 36f via the leads 36f using any serial or parallel communication protocol.

The real-time clocks are available from many different manufacturers. For example, the MT41T6X family offered by STMicroelectronics, Geneva, Switzerland, is a serial real-time clock that has an integrated crystal and draws a timekeeping current of only 350 nA at 3.0V. The MT41T6X has registers for seconds, minutes, hours, day, date, month, year, and century. The MT41T6X also has registers for alarm and alarm status, all accessible via an I2C bus to the programmable integrated circuit (172). The MT41T6X is available at a very small package that has a foot print of 1.5 mm×3.2 mm.

After the user has entered the current time, date, and the desired on/off schedule, the programmable integrated circuit 98 processes, sorts, and stores the entered data in its flash memory, and also writes the required actuation times to the alarm registers of the real-time clock 170. The real-time clock generates interrupts at exact prescribed times stored in its alarm registers. The programmable integrated circuit 98 receives and processes the interrupts from the real-time clock 170 and turns on/off or sets the duty cycle of the PWM signal 32 accordingly.

The user control means 34 may include one or more small LEDs installed in the faceplate 23 of the LED driver to indicate the output status of the LED driver during operation (not shown). For example, a small red LED turns on when the LED load 28 is turned on.

Figure 17:
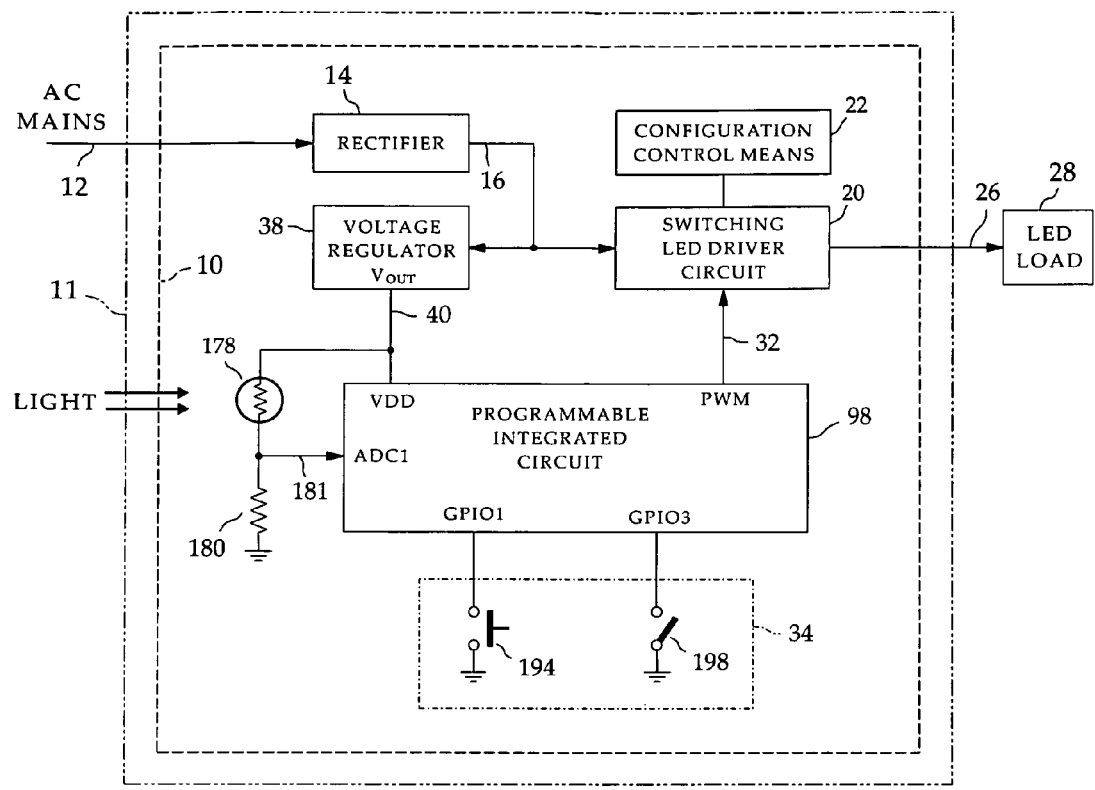
FIG. 17a is the block diagram of the LED driver that automatically adjusts the brightness of LEDs to maintain a constant light in the environment.
FIG. 17b illustrates the overall appearance of the LED driver which automatically adjusts the brightness of LEDs to maintain a constant light in the environment.
Figure 17:
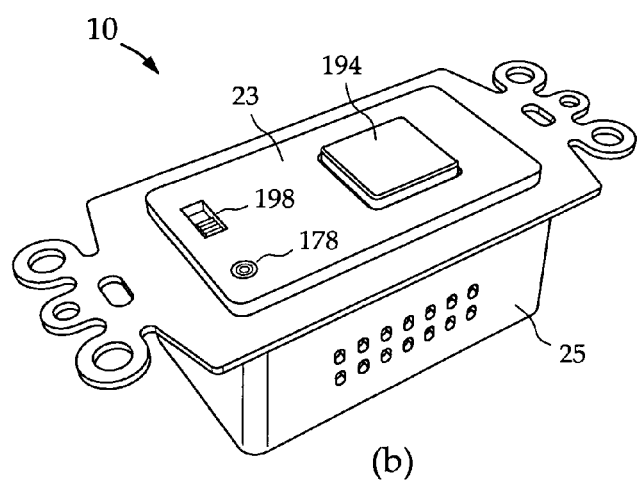

FIG. 17a illustrates the block diagram of another embodiment of the present invention, in which a small light sensor (e.g. an LDR) 178 is employed in the LED driver 10 to automatically adjust the brightness of the LED load 28 to maintain a relatively constant light in the environment. The light sensor 178, which is available from many vendors such as Advanced Photonix Inc., Ann Arbor, Mich., is implemented in the faceplate 23 (FIG. 17b) of the LED driver 10 such that its lens is exposed to the ambient light. The LED driver 10 also contains an override switch 198 that disables the automatic function of the LED driver 10. During the override, a user can turn the LED load 28 on/off using the exemplary switch 194, or dim/brighten the LEDs if desired.

Referring to FIG. 17a, the LED driver 10 contains a series circuit comprised of a light sensor 178 and a resistor 180. The output of the series circuit is fed via the lead 181 to the input of an analog-to-digital converter (ADC) within the programmable integrated circuit 98. An increase in the ambient light causes a decrease in the voltage applied to the ADC input of the programmable integrated circuit 98.

To automatically maintain the LED light at a desired level, the user first sets the override switch 198 to the open position to disable the automatic brightness function. The user then manually adjusts the brightness of the LED load 28 using the switch 194. And finally, the user closes the override switch 198 to enable the automatic brightness function again. The programmable integrated circuit 98 is programmed to sample the analog voltage in the lead 181 at the moment the switch 198 is closed. The ADC integrated with the programmable integrated circuit 98 converts the sampled analog voltage to digital value. Typically, the result of the conversion is automatically stored in an ADC register, which is a register dedicated to the ADC module. The content of the ADC register is then transferred to a general purpose register. At this time, the program in the programmable integrated circuit 98 enters a conditional loop that continuously samples the analog voltage in the lead 181, converts the sampled voltage to digital, and compares the converted value to the value stored in the general purpose register. If the two values are not equal, the programmable integrated circuit adjusts the duty cycle of the PWM until the two values are equal. Therefore, the conditional loop adjusts the intensity of the LED load 28.

For instance, if the ambient light level decreases as a result of the sunset, voltage in the lead 181 drops because the resistance of the light sensor 178 increases. Therefore, the programmable integrated circuit 98 increases the duty cycle of the PWM, which increases the brightness of the LED load 28, which lowers the resistance of the light sensor 178, which increases the voltage in the lead 181. Therefore, the conditional loop in the program of the programmable integrated circuit 98 automatically adjusts the brightness of the LED load 28 to maintain a constant level of light in the environment.

FIG. 17b illustrates the overall appearance of the LED driver 10 with the light sensor 178, override switch 198, and the potentiometer 180 in the faceplate 23 of the LED driver 10.

Some LED driver applications may not require dimming functionality. For example, the LED drivers used in stores, libraries, and work places may require only an on/off switch. In such a case, a PWM generator for brightness adjustment is unnecessary.

Figure 18:
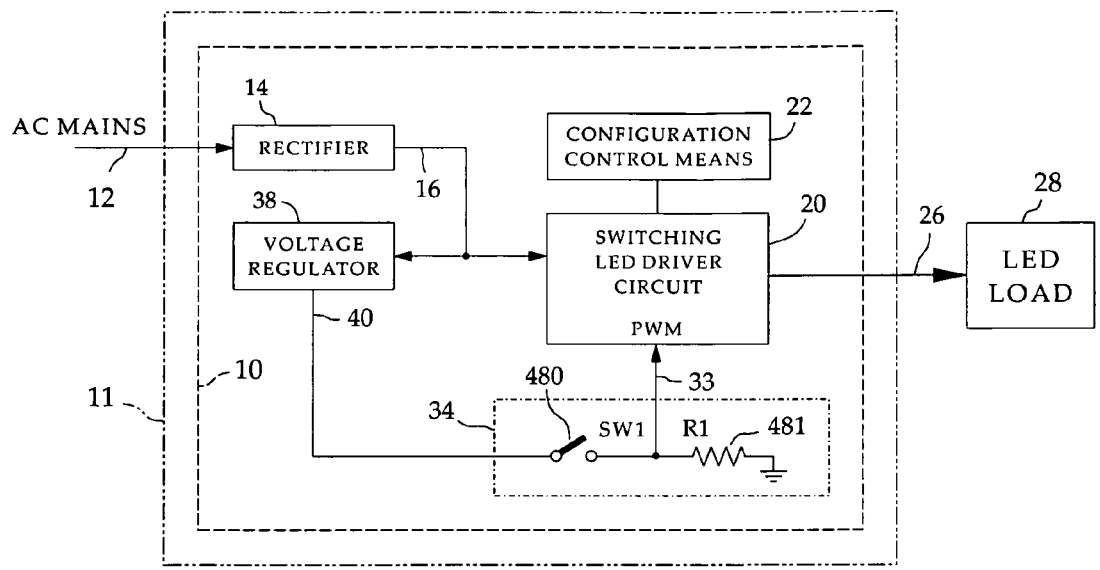
FIG. 18a shows a variation of the LED driver used for simple on/off applications, which does not include brightness adjustment.
FIG. 18b shows a variation of the LED driver where a single switch is used for both on/off as well as brightness adjustment.
Figure 18:
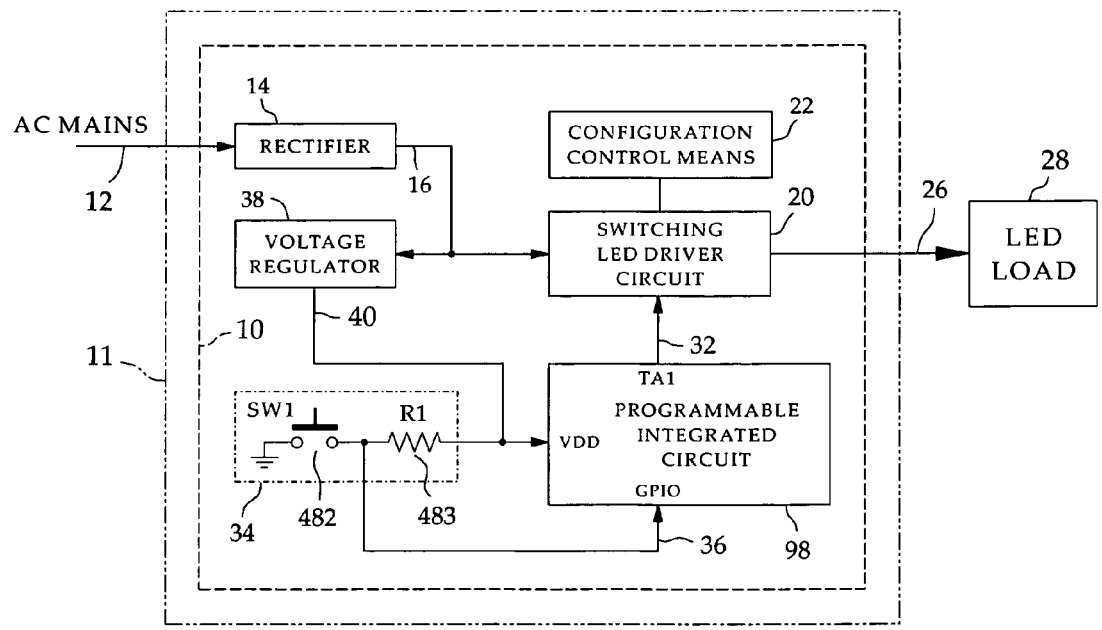

FIG. 18a illustrates the LED driver 10 of the present invention, in which the user control means 34 does not include brightness adjustment. In FIG. 18a, the user control means 34 comprises a single switch 480 and a pull-down resistor 481. The output of the user control means 34 is applied to the PWM input of the switching LED driver 20 via the lead 33. When the switch 480 is open, the PWM input of the switching LED driver 20 is pulled low via the resistor 481; therefore, the LED load 28 is off. When the switch 480 is closed, the PWM input of the switching LED driver 20 is at high logic state; therefore, the LED load 28 turns on at maximum brightness.

The switch 480 in FIG. 18a operates within a very low-voltage and very low-current circuit; therefore, a very low-cost switch having a low-contact rating could be employed. As such, the switch 480 will last for a very long time because its contacts will not deteriorate due to arcing or overheating.

FIG. 18b shows the LED driver 10 of the present invention, in which a programmable integrated circuit 98 is employed to control on/off as well as brightness adjustment of the LED load 28. In FIG. 18b, the PWM signal is generated by a programmable integrated circuit 98. The switch 482 in FIG. 18b is used to toggle the LED load 28 on/off, or if desired, to adjust the brightness. The resistor 483 functions as a pull-up resistor for the GPIO input of the programmable integrated circuit 98.

The switch 482 in FIG. 18b is a push-button switch interfaced to a general purpose input/output (GPIO) pin of the programmable integrated circuit 98. The programmable integrated circuit 98 is, for instance, an ultra-low power microcontroller. The GPIO pin is preferably interrupt-capable. When switch 482 is open, the GPIO pin has a digital 'high' state via resistor 483 and lead 36. When the switch 482 is pressed, the GPIO pin has a digital 'low' state. A switch closure triggers an interrupt routine in the programmable integrated circuit 98. The programmable integrated circuit 98 checks every switch closure to determine if the closure is short or long. A short switch closure toggles the PWM generation on/off (i.e. it enables or disables the PWM generation).

When no PWM pulse is applied to the LED driver circuit (i.e. duty cycle of zero percent), the LEDs are off. The programmable integrated circuit 98 is programmed to toggle between incrementing/decrementing a caption/compare register for long closures of switch 482. Changing the value stored in the caption-compare register changes the duty cycle of the PWM signal. It is also possible to generate a PWM signal using a microcontroller that does not have an onboard caption-compare register using various looping techniques; however, the use of onboard peripherals such as a caption-compare registers is preferred because such peripherals consume very little power and can operate even when the CPU is in hibernate mode. Using looping techniques requires CPU activity, which leads to higher power consumption. The overall appearance of the LED driver 10 using a single push button switch as the user control means is shown in FIG. 2.

Other methods of dimming are well known. For example, linear dimming is a convenient method of dimming LEDs. For instance, linear dimming in HV9910B integrated circuit is accomplished by changing the current limit threshold at the current sense comparator, which in turn changes the output current. The current sense comparator is integrated in the HV9910B. The linear dimming has a drawback. Namely, it changes the current in the LEDs. Changing the current in white LEDs causes a noticeable shift in the color of the radiated light. This method may be used for non-white LEDs or if the color shift is acceptable for the intended application.

Figure 19:
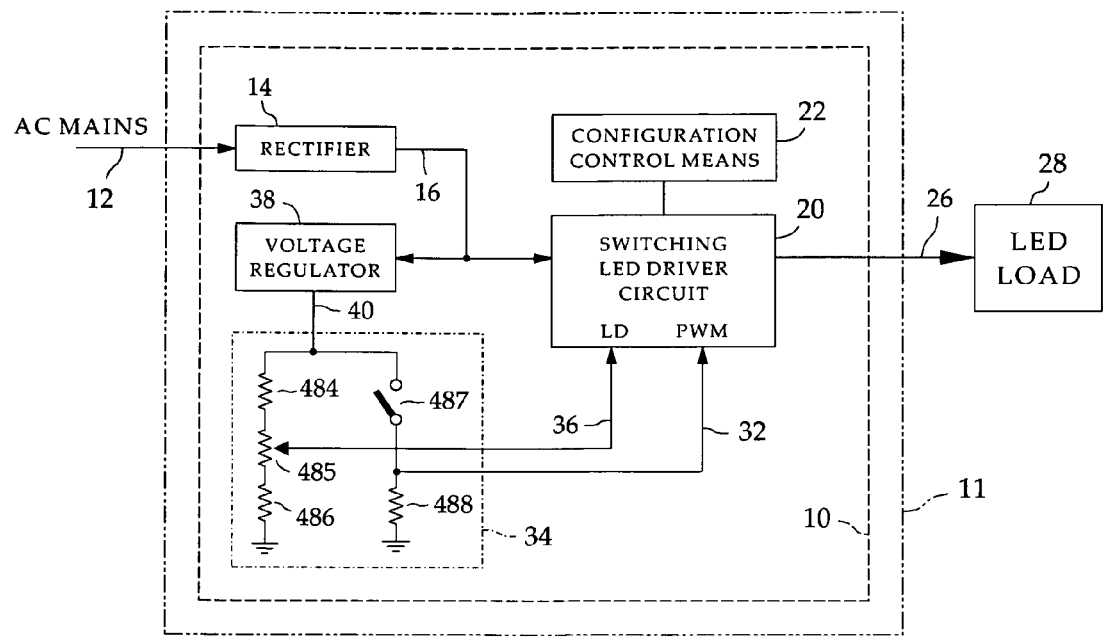
FIG. 19a illustrates a variation of the configurable LED driver, in which brightness adjustment is accomplished using linear dimming method.
FIG. 19b illustrates a variation of the LED driver, in which a variable resistor is used to adjust the brightness, and a switch is used to toggle the LEDs on/off.
Figure 19:
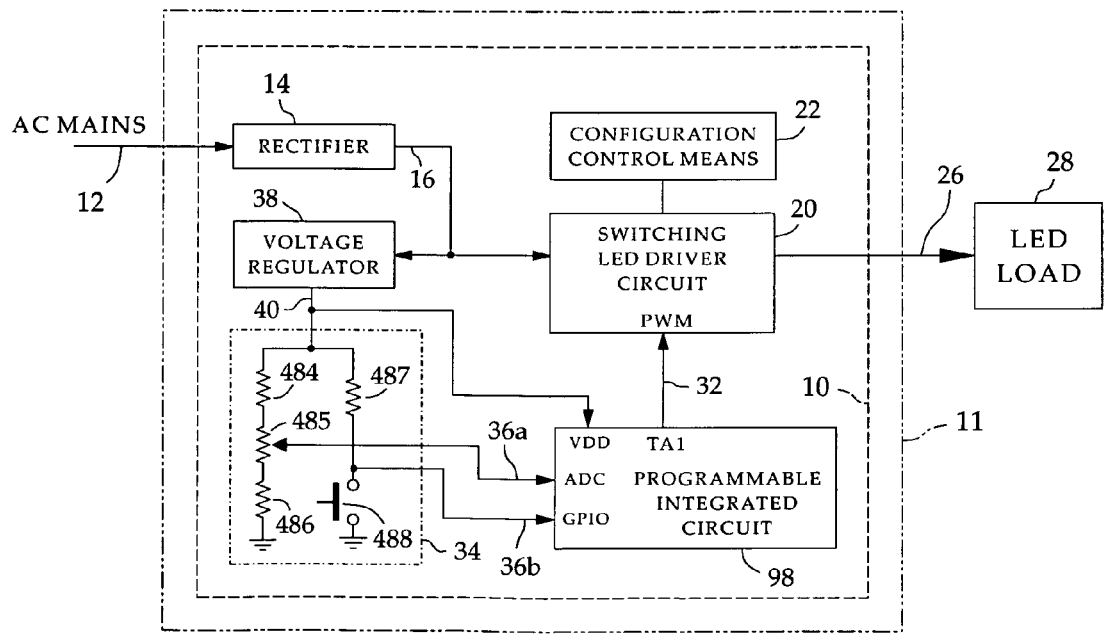

FIG. 19a illustrates the LED driver of the present invention, in which brightness adjustment is accomplished using linear dimming and without a PWM generator. In FIG. 19a, the series circuit comprised of resistor 484, variable resistor 485, and resistor 486 establish a voltage divider circuit for the voltage supplied by the voltage regulator 38 in the lead 40. The resistor values and the variable resistor (e.g. potentiometer) value are selected such that the applied voltage to the LD pin of HV9910B changes from zero volts to 250 mV when the wiper of the variable resistor 485 sweeps from zero ohms to the maximum resistance. The switch 488 can turn the LEDs on or off. The switch 488 can be an onboard switch with the variable resistor 485, or it can be a discrete switch. The resistor 487 is the pull-up resistor for the GPIO input of the programmable integrated circuit 98.

FIG. 19b illustrates the LED driver 10, in which a variable resistor 485 (e.g. a potentiometer) is used to adjust the brightness of the LED load 28 by adjusting the duty cycle of the PWM signal applied to the switching LED driver circuit 20. The switch 488 is used to toggle the LED load 28 on/off. The switch 488 is interfaced to a GPIO pin of the programmable integrated circuit 98 to toggle the LED load 28 on/off (in a similar manner described in FIG. 18b), which can be an integrated switch with the variable resistor 485.

The programmable integrated circuit 98 can be an ultra-low-power microcontroller with an integrated analog-to-digital converter (ADC). The output voltage from the wiper of the potentiometer 485 is converted to digital data by the ADC within the programmable integrated circuit 98. The digital data is scaled and stored in a caption-compare register to generate the corresponding PWM duty cycle from zero to 100%.

Figure 20:
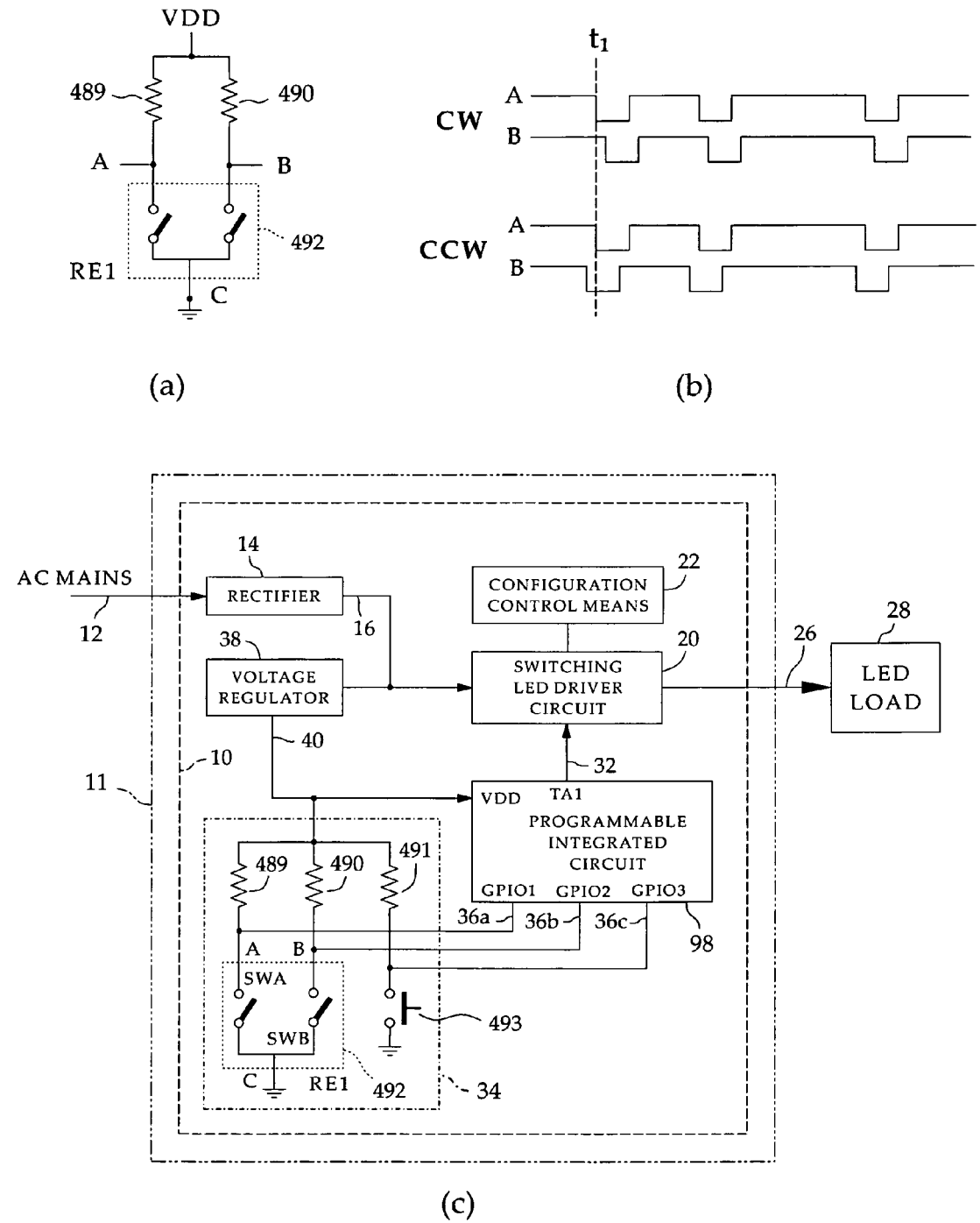

FIG. 20c illustrates the LED driver 10, in which the user control means 34 is comprised of a rotary encoder 492 for brightness adjustment and a switch 493 for on/off control.

The rotary encoder 492, which is available from many vendors such as CUI Inc., Tualatin, Oreg., has three terminals that are labeled A, B, and C (FIG. 20a). Terminal C is connected to the ground of the circuit, while terminals A and B are connected to VDD using the pull-up resistors 489 and 490 as shown in FIG. 20a. Normally, both the A and B terminals are at a 'high' logic state. Rotating the shaft of the encoder generates short duration pulses (FIG. 20b). When the shaft is rotated clockwise (CW), the pulses at terminal A lead the pulses at terminal B at the reference time t1 (FIG. 20b). When the shaft is rotated counterclockwise (CCW), the pulses at terminal B lead the pulses at terminal A at the reference time t1. The resolution of a rotary encoder is defined as the number of pulses at a terminal of the rotary encoder when the shaft is rotated 360 degrees.

In FIG. 20c, the pulses from terminals A and B are decoded using two general purpose input/output pins GPIO1 and GPIO2 of the programmable integrated circuit 98 via the leads 36a and 36b correspondingly. To minimize the power consumption of the programmable integrated circuit 98, it is preferred that the decoding scheme programmed in the programmable integrated circuit 98 uses an interrupt-driven routine. For instance, terminal A is connected to GPIO1 pin of the programmable integrated circuit 98, which is enabled to trigger an interrupt on a high-to-low transition of the applied pulse from terminal A. When the interrupt is triggered, the instruction code in the interrupt routine polls the status of the pulse from terminal B which is applied to the GPIO2 of the programmable integrated circuit 98. If terminal B is at a 'high' state, then the pulse was generated by a "clockwise" rotation of the rotary encoder 492; if terminal B is at a 'low' state, the pulse was generated by a "counterclockwise" rotation of the rotary encoder 492.

For each clockwise pulse detected by the programmable integrated circuit 98, the data in the caption-compare register is incremented. If the pulse was created by a counterclockwise rotation of the rotary encoder 492, then the data in the caption-compare register is decremented. The data stored in the caption-compare register determines the duty cycle of the PWM signal generated by the programmable integrated circuit 98. Other methods could be employed to detect the CW/CCW pulses of a rotary encoder, which include software methods and/or hardware methods (i.e. using discrete components). Alternatively, an ASIC could be employed for pulse detection from the rotary encoder 492.

The switch 493 in FIG. 20c is used to toggle the PWM signal on/off for the purpose of turning the LED load 28 on/off in a similar manner described in FIG. 18b. The switch 493 is preferably integrated with the rotary encoder 492, or it can be a discrete switch installed separately on the faceplate of the LED driver 10.

Figure 21:
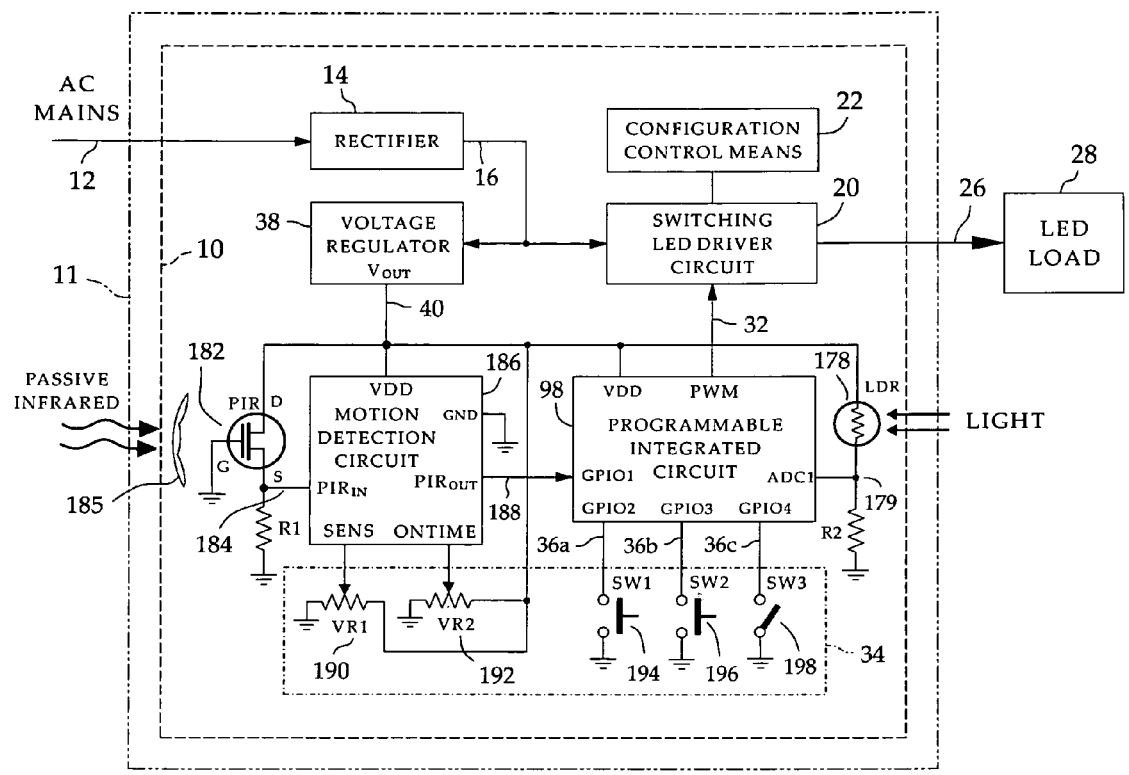
FIG. 21a is the block diagram of an LED driver with motion detection circuitry, in which the LED driver turns on at a constant programmable light level in the room regardless of changes in the environment's ambient light when a motion is detected.
FIG. 21b illustrates the overall appearance of the LED driver with motion detector and light sensor circuitry.
Figure 21:
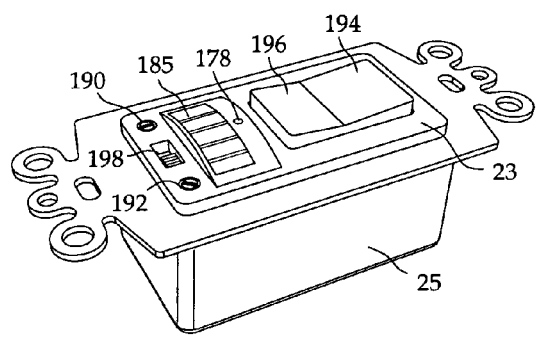

FIG. 21a depicts a circuit block diagram of an automatic sensor-based embodiment of the LED driver 10, in which the LED load 28 is automatically turned on when a person moves in the field-of-view of the passive-infrared sensor (PIR) 182 installed behind a Fresnel lens 185 in the faceplate 23 (FIG. 21b) of the LED driver 10. Additionally, a light-dependent resistor (LDR) 178 senses the ambient light level and automatically adjusts the brightness of the LED load 28. In addition to the aforementioned sensors, closing the "override" switch 198 enables the LED driver 10 to be operable using the switches 194 and 196 to manually turn the LED load 28 on or off, or if desired, to adjust the brightness level. Integration of the motion detection and light level sensors make the present embodiment a useful sensor-based energy saving LED driver.

PIR sensors are available from many vendors; for instance, the LHi878 is available from Perkin Elmer, Waltham, Mass. PIR sensors are used extensively in security systems for intrusion detection, and in automatic sliding doors. A PIR sensor is designed to be sensitive to the passive infrared radiation from a human body. In FIG. 21a, the PIR sensor 182 generates small AC signals when a person moves in its field-of-view (i.e. detection area). The Fresnel lens 185 is an infrared filter that increases the field-of-view for the PIR sensor 185. The small AC signals generated by the PIR sensor 182 are sent to the motion detection circuit 186 via the lead 184. The motion detection circuit can be an ASIC such as "E931.97" manufactured by ELMOS semiconductor AG, Dortmund, Germany.

The small AC signals from the PIR sensor 182 are filtered, amplified, digitized, and signal-processed by the motion detection circuit 186. If the signal-processed voltage is greater than a threshold set by the variable resistor 190, then the output voltage of the motion detection circuit 186 in the lead 188 changes to a logic state "high". The variable resistor 190 sets the sensitivity for the detection. For instance, to detect a moving person in a large detection area, the variable resistor 190 needs to be increased. The variable resistor 192 adjusts the on-time for the output of motion detection circuit 186, which determines the amount of time the output voltage in the lead 188 remains at a logic state "high" after a motion is detected. If the on-time expires, the output voltage of the motion detection circuit 186 in the lead 188 changes back to a logic level "low" (i.e. zero volts).

The output voltage of the motion detection circuit 186 is applied to a general purpose input/output pin (GPIO1) of the programmable integrated circuit 98 via the lead 188. The general purpose input/output pin (GPIO1) is preferably interrupt-capable so that an interrupt is triggered every time the output of the circuit 186 changes from the logic state "low" to the logical state "high".

The interrupt routine in the program of the programmable integrated circuit 98 includes an instruction code to turn the PWM signal in the lead 32 on when a motion is detected; therefore, the LED load 28 turns on. The LED load 28 remains on until the on-time set by the variable resistor 192 has expired. The programmable integrated circuit 98 could be an ultra-low power microcontroller such as MSP430 from Texas Instruments, or dsPIC from Microchip Technology.

Also shown in FIG. 21a is the override switch 198 that disables the automatic function, and enables the LED driver 10 to be manually operable using switches 194 and 196. The override function of the override switch 198 can be implemented in many different ways. For example, the programmable integrated circuit 98 disables the interrupt for the GPIO1 and enables the interrupt for the GPIO2 and GPIO3 if the override switch 198 is closed. Disabling the interrupt for the GPIO1 means that the programmable integrated circuit 98 will not turn on the PWM signal; therefore, the LED load 28 is off. Meanwhile, enabling the interrupt for the GPIO2 and GPIO3 means that the programmable integrated circuit 98 can process the interrupts due to the closures of the switches 194 and 196. The switch 194 could function as an ON switch when momentarily closed, or brighten the LEDs when it is pressed and held. The switch 196 could function as an OFF switch when momentarily closed, or dim the LEDs when it is pressed and held.

In addition to the PIR sensor 182, the LED driver 10 contains a visible light sensor 178 (e.g. a light dependent resistor LDR) 178 to automatically adjust the brightness of the LED load 28 to maintain a relatively constant light in the environment. The operation of the light sensor 178 with the programmable integrated circuit 98 was previously described in the light sensor embodiment of the present invention. When the override switch 198 is closed, a user can turn the LED load on/off or adjust the brightness using the switches 194 and 196. When the override switch 198 is open, the LED load 28 is turned on only when a motion is detected. During the time the LED load 28 is on, the brightness of the LEDs are automatically adjusted to maintain the light in the environment at the level when the override switch 98 was opened.

It is possible to apply the small signal from the PIR sensor 182 directly to a programmable integrated circuit that has an integrated amplifier and analog-to-digital converter (ADC) without the use of the external motion detection circuit 186; however, using an external ASIC to amplify and process the PIR signals helps free-up the resources and the peripherals in the programmable integrated circuit 98. Modern PIR sensors are available that integrate the entire motion detection circuit into a small three-pin PIR sensor. For example, the PYD1998 offered by Perkin Elmer, Waltham, Mass., is a small, three-pin, digital-output PIR sensor that can directly communicate the motion detection data with the programmable integrated circuit 98. However, the cost for highly integrated PIR sensors is much higher than a basic PIR sensor.

In another embodiment of the present invention, the output voltage and/or output current of the LED driver is configured by presetting one or more semiconductor switches and/or circuits. Semiconductor switches and circuits are non-mechanical switches that are reliable, long lasting, and have small footprints. The semiconductor switches and circuits are typically controlled by signals from a programmable integrated circuit (to be described).

Figure 22:
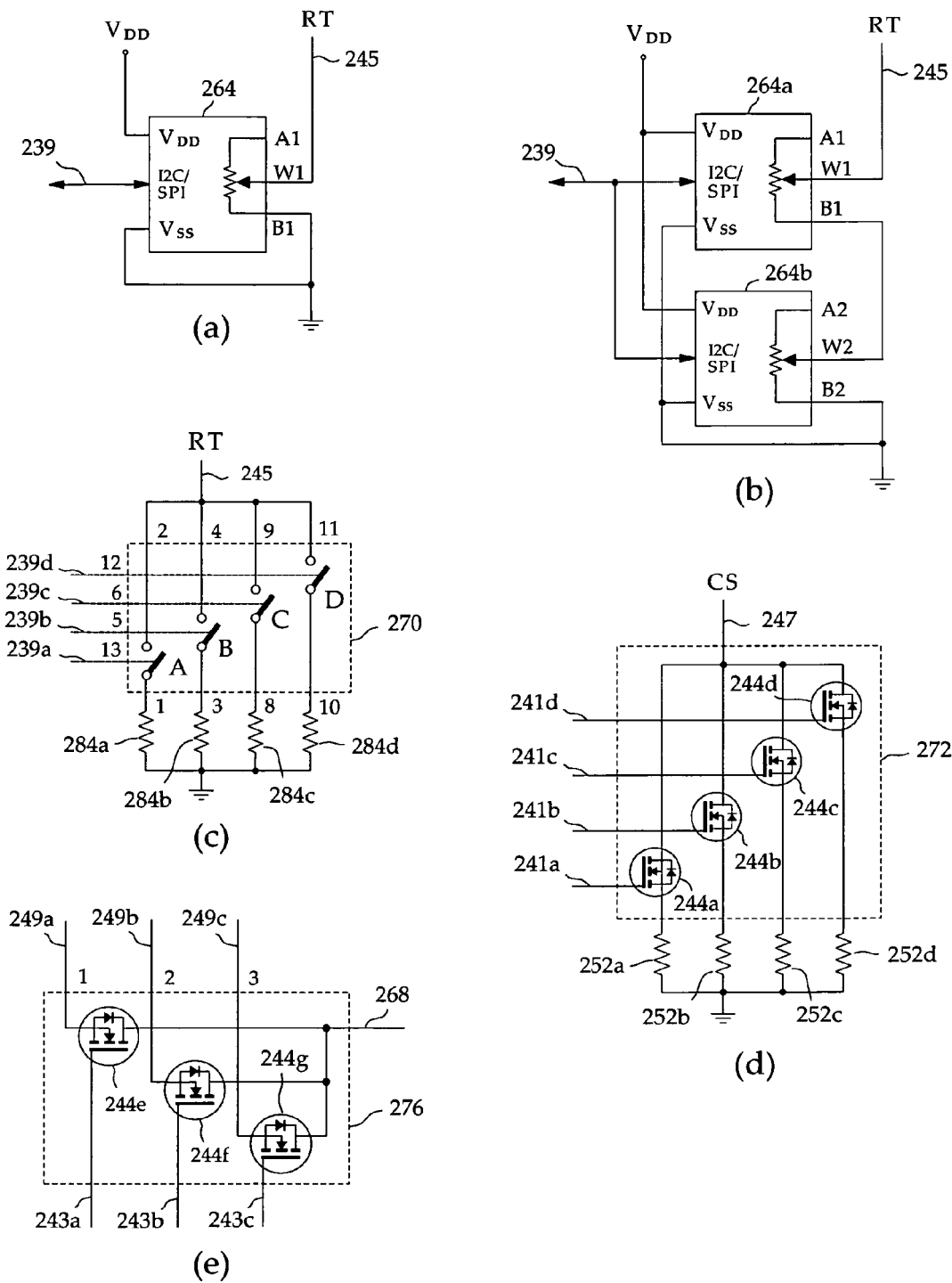
FIG. 22a illustrates a wiring diagram for a typical digital potentiometer.
FIG. 22b illustrates two digital potentiometer wired in series.
FIG. 22c illustrates the wiring diagram for an analog switch block.
FIG. 22d illustrates a semiconductor switch block that contains four MOSFET transistors.
FIG. 22e illustrates a semiconductor switch block that includes three MOSFET transistors.

Referring to FIG. 22a, the digital potentiometer 264 is a non-mechanical potentiometer (i.e. a semiconductor circuit) that its resistance can be adjusted using external signals via the leads 239. The leads 239 include data and control leads that are interfaced to a programmable integrated circuit. Similar to a common mechanical potentiometer, the digital potentiometer 264 has three terminals A1, B1, and W1 (shown in FIG. 22a). The A1 and B1 are the end terminals, and W1 is the "wiper" terminal. In this embodiment, the end terminal B1 and the wiper terminal W1 are used to provide an adjustable resistance between the lead 245 and the ground of the circuit. Therefore, the digital potentiometer 264 can effectively replace the combo of the switch block 70 and the frequency setting resistors 84a thru 84f (in FIG. 6a). As the result, the frequency of the oscillator 42 (in FIG. 6a) can be adjusted using the digital potentiometer 264 (in FIG. 22a).

Digital potentiometer 264 is available from many vendors such as Maxim Integrated Products, San Jose, Calif. It is possible that two or more digital potentiometers may be employed in series for fine adjustment of the oscillator frequency 42 (in FIG. 6a). For instance, FIG. 22b illustrates a digital potentiometer 264a in series with the digital potentiometer 264b to provide an adjustable resistance between the lead 245 and the circuit ground (lead 245 connects to W1, B1 connects to W2, and B2 connects to the circuit ground). The digital potentiometer 264a may have a relatively high resistance for coarse adjustment between terminals W1 and B1, while the digital potentiometer 264b may have a relatively low resistance for fine adjustment of the resistance between the terminals W2 and B2. As the result, the total resistance between the lead 260 and the circuit ground is the series equivalent resistance of digital potentiometers 264a and 264b and can be precisely adjusted. It is possible to place a fixed resistor in series with a terminal of the digital potentiometer 264 to offset its resistance (not shown).

FIG. 22c illustrates analog switch block 270, which can replace the switch block 70 (in FIG. 6a). An "analog switch" is another type of a semiconductor switch. The exemplary analog switch block 270 contains four analog switches A, B, C, and D; each switch can independently be opened or closed using its dedicated control lines 239a, 239b, 239c, and 239b correspondingly. Analog switch blocks are available from many vendors; for instance, the analog switch block CD4066 is a quad analog switch block manufactured by Texas Instrument, Dallas, Tex. Two or more analog switch blocks could be employed if more than four analog switches are required for the design.

The operation of the analog switch block 270 is described herein. For example, in FIG. 22c, when the logic state in the lead 239a is "high", the analog switch A is closed; therefore, the effective resistance between the lead 245 and the circuit ground is the resistance of the resistor 284a. Two or more analog switches within the analog switch block 270 may be closed if required. For instance, if the analog switches B and C are closed, then the effective resistance between the lead 245 and the circuit ground is the equivalent resistance of (284b in parallel with 284c).

FIG. 22d illustrates four MOSFET transistors (i.e. semiconductor switches) 244a thru 244d, which form a semiconductor switch block 272. Each semiconductor switch within the semiconductor switch block 272 can be opened or closed via its control line (i.e. its gate). The circuit shown in FIG. 22d can replace the combo of the switch block 72 and four current sense resistors 52a thru 52d (in FIG. 6a).

The operation of the semiconductor switch block 272 (in FIG. 22d) is explained herein. When the logic state in the lead 241a is "high", the semiconductor switch 244a is "closed"; therefore, the total resistance between the lead 247 and the circuit ground is the resistance of the resistor 252a (assuming that the on-resistance of the MOSFET 244a is zero; many modern MOSFETs have on-resistance in the order of milli-Ohms). Similarly, when the logic state in the leads 241c and 241d are at "high" while the logic state in the leads 241a and 241b are at "low", then the effective resistance between the lead 247 and the circuit ground is the equivalent resistance of (252c in parallel with 252d).

FIG. 22e depicts a semiconductor switch block 276 that contains three MOSFET transistors (i.e. semiconductor switches) 244e, 244f, and 244g. Each semiconductor switch in the semiconductor switch block 276 can be opened or closed using the leads 243a thru 243c, which are typically connected to a programmable integrated circuit. The semiconductor switch block 276 shown in FIG. 22e can replace the switch block 76 (in FIG. 6a). The leads 249a thru 249c connect to the taps of the inductor L (in FIG. 6a). The lead 268 connects to the negative terminal of the LED load 28 (in FIG. 6a).

Figure 23:
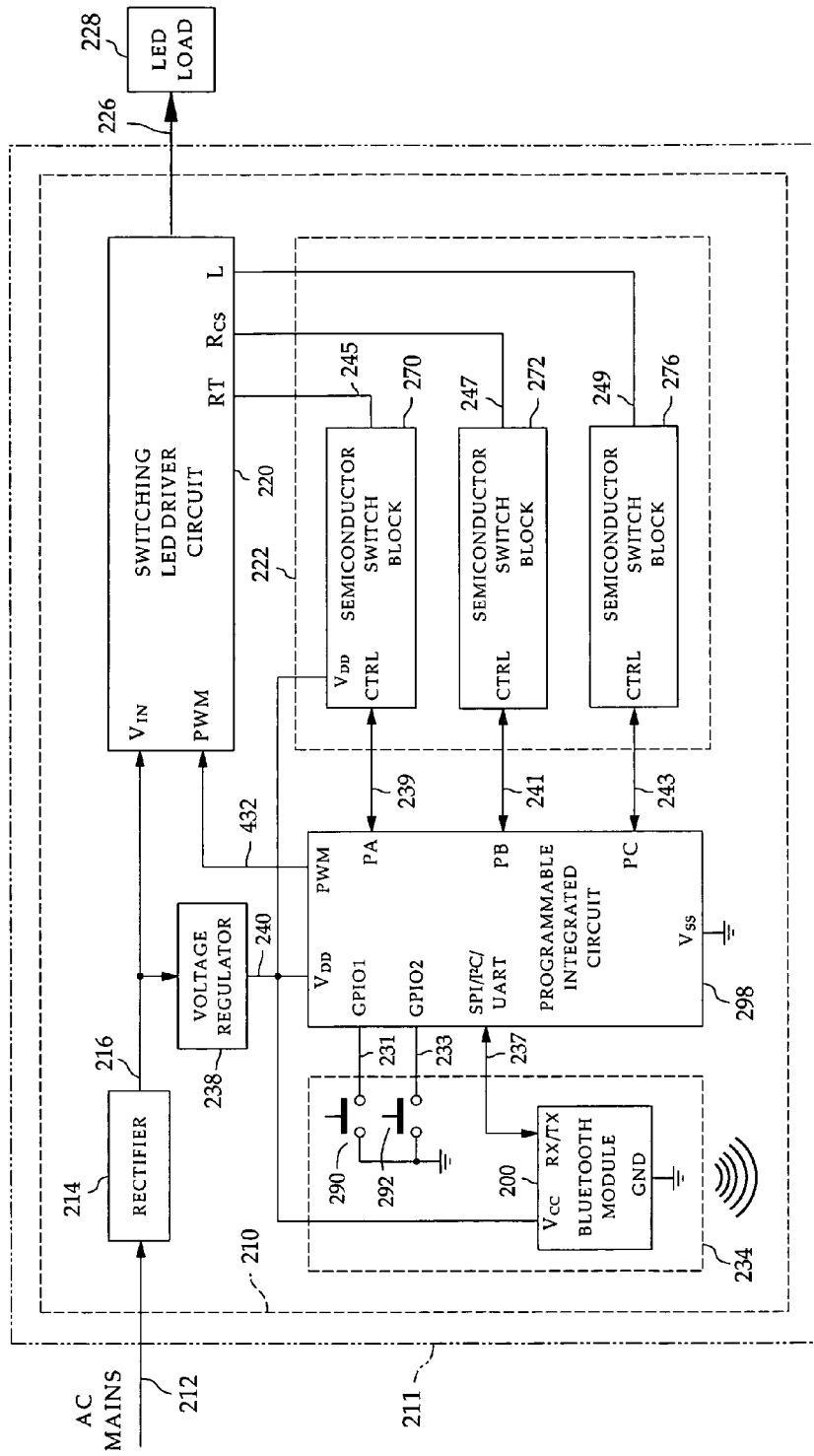
FIG. 23 illustrates the block diagram of the LED driver, in which the configuration control means can be wirelessly adjusted using an exemplary smartphone.
Figure 23:
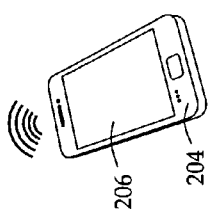

Referring to FIG. 23, the LED driver 210 of the present invention comprises a configuration control means 222. The configuration control means 222 comprises a semiconductor switch block 270, 272, and 276. The switch block 272 is used to set the oscillator frequency within the switching LED driver circuit 220 via the lead 245. The switch block 272 is used to set the current sense resistance in the switching LED driver circuit 220 via the lead 247. The switch block 276 is used to select a tap of the inductor L within the switching LED driver circuit 220 via the leads 276.

An end user operates and configures the LED driver 210 using an exemplary smartphone 204. The program in the smartphone 204 has preferably two separate menus: one for controlling the LED driver 210, and one for configuring the output voltage and/or current of the LED driver 210. The menus for the configuration are preferably password protected to make it temper proof.

The control of the LED driver using a smartphone was described previously. The configuration control means is programmed in a similar manner (to be described using illustrations in FIG. 24).

In response to the configuration instructions entered by the end user on the touch screen 206 of the smartphone 204, the smartphone 204 encodes and transmits the configuration data. The Bluetooth module 200 serially communicates the received configuration data via interface lines 237 with the programmable integrated circuit 298. The programmable integrated circuit 298 decodes, processes, and saves the configuration instructions in non-volatile memory (i.e. flash memory). Upon the reception of the instructions, the programmable integrated circuit 298 sets the appropriate logic levels in the leads 239, 241, and 243 in order to "open" or "close" the individual semiconductor switches within the semiconductor switch blocks 270, 272, and 276. In this manner, the output voltage and output current of the LED driver 210 are configured with no need for removing the LED driver 210 from the AC outlet 211.

The application program (i.e. app) in the smartphone 204 may include a query menu to wirelessly request the current configuration settings of the LED driver 210. In response to a query, the programmable integrated circuit 298 recalls the configuration data from its non-volatile memory and transmits them to the Bluetooth module 200 via the leads 237 so that they can be wirelessly transmitted to the smartphone 204.

Other useful information could be stored in the non-volatile memory of the programmable integrated circuit 298 to transmit to the smartphone 204 in response to a query. For instance, name of manufacturer, serial number, model number, data of manufacture, electrical ratings can be transmitted in addition to the current configuration settings.

The programmable integrated circuit 298 could be an ultra-low power microcontroller such as MSP430 manufactured by Texas Instruments, Dallas, Tex.

The teachings of this embodiment can be employed in other wireless platforms such as the Wi-Fi enabled LED driver, disclosed previously.

The LED driver 210 is packaged to fit inside an AC outlet 211 and connects to the AC mains via leads 212. The AC mains current is rectified and filtered by 214, and provided to the switching LED driver circuit 220. The output of the switching LED driver circuit connects to the LED load 228 via leads 226. The voltage regulator 238 generates a low DC voltage to power the Bluetooth module 200, the programmable integrated circuit 298, and the digital potentiometer 270 via the lead 240.

The LED driver 211 can also be locally operated using the exemplary switches 290 and 292, which are interfaced to two general purpose input/output pins via the leads 231 and 233.

The application program installed in the smartphone 204 (in FIG. 23) includes the routines to operate, configure, and display the status of the LED driver 210 if desired. Referring to FIG. 24a, the exemplary smartphone 204 has a GUI screen 206, which includes three touch buttons: The control 434 button launches the control screen, the configure 422 button launches the configure menu screen, and the status 450 button launches the status screen.

Figure 24B:
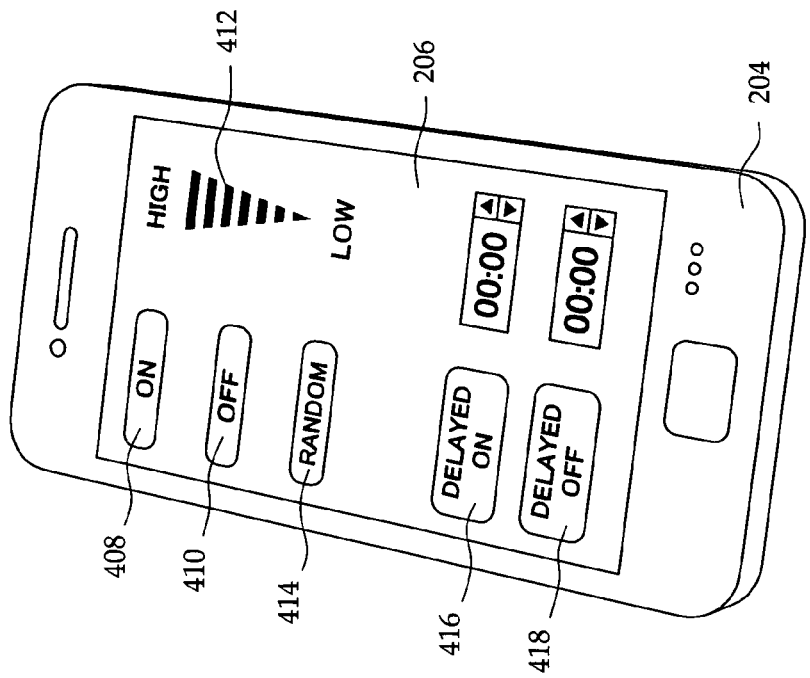
FIG. 24b illustrates the exemplary control menu displayed when the control button in FIG. 24a is touched.
Figure 24A:
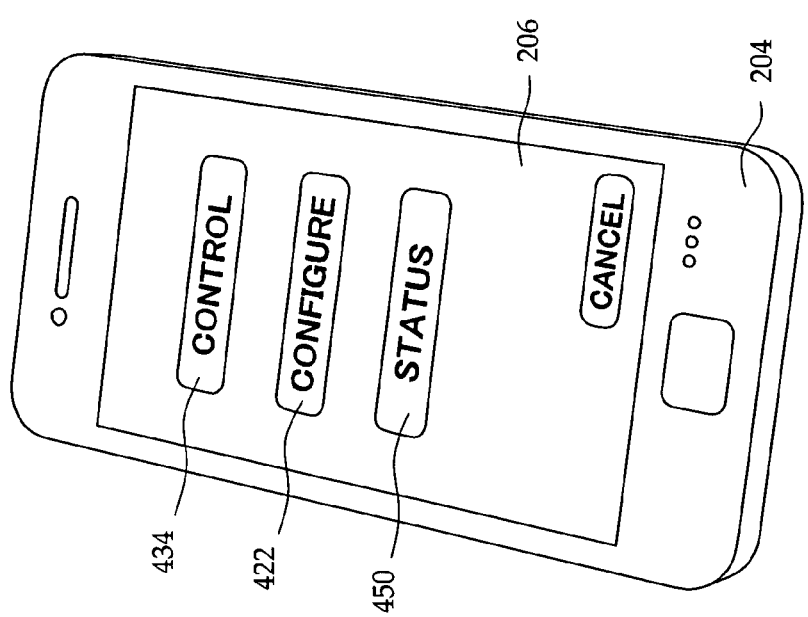
FIG. 24a illustrates an exemplary menu on the graphical user interface of an exemplary smartphone to control, configure, and display the status of the LED driver.

The control screen shown on the GUI screen 206 in FIG. 24b is displayed when the control button 434 (in FIG. 24a) is touched. In FIG. 24b, the control menu includes buttons such as ON button 408, off button 410, brightness adjustment slide bar 412, random button 414 (for random on/off of LEDs), delayed-on button 416 (for turning the LEDs on after a desired delay), and delayed-off button 418 (for turning the LEDs off after a desired delay).

In FIG. 24a, when the configure button 422 is touched, a password screen (shown in FIG. 24c) is launched to prevent access to the configuration screen by unauthorized users. The password screen includes numeric buttons 452.

Figure 24D:
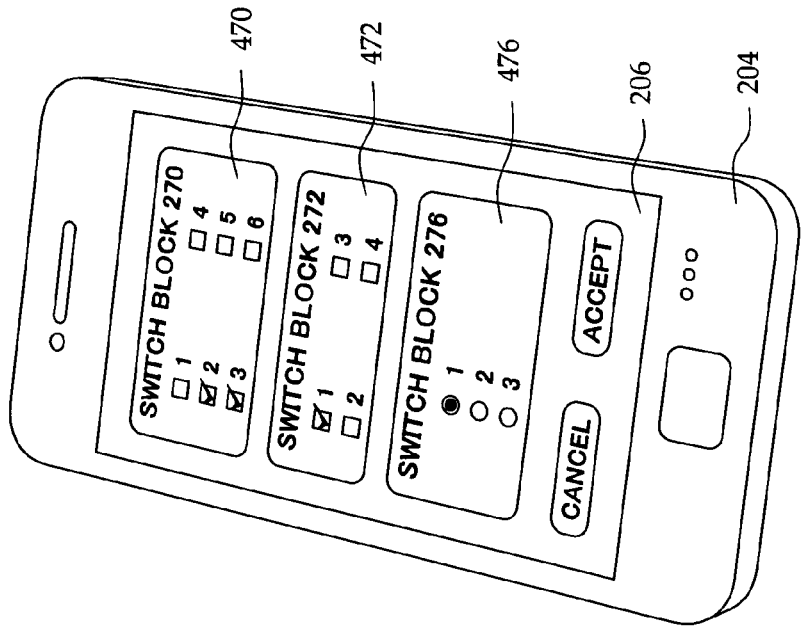
FIG. 24d illustrates the configure menu on an exemplary smartphone that allows a user to configure the output voltage and/or current of the LED driver wirelessly.
Figure 24C:
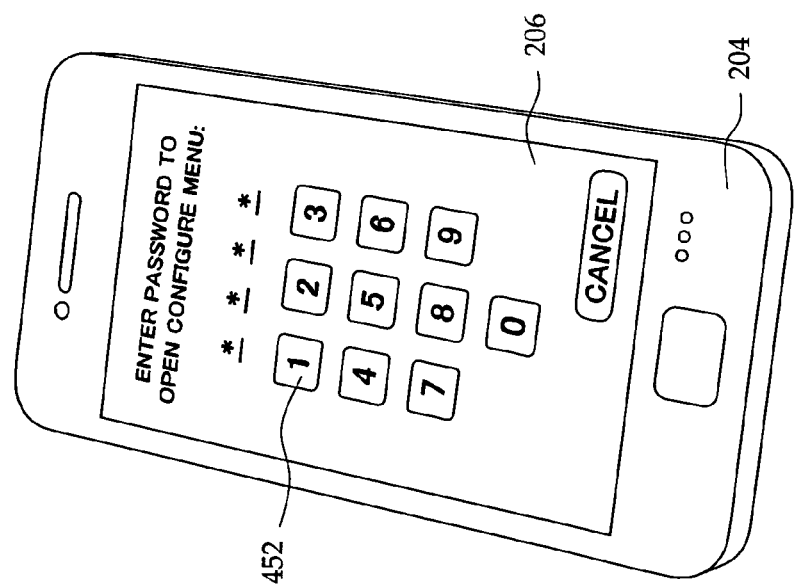
FIG. 24c illustrates the password protection screen intended to protect the configure menu from unauthorized users.
Figure 24E:
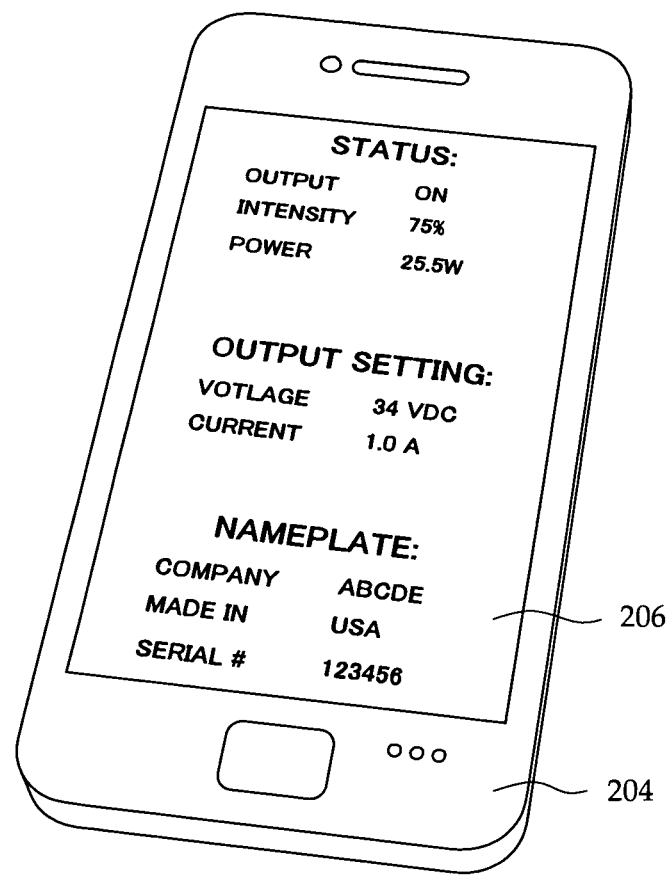
FIG. 24e illustrates an exemplary status screen that is displayed on the graphical user interface of an exemplary smartphone when the status button in FIG. 24a is touched.

Referring to FIG. 24d, a configuration screen is displayed on the GUI screen 206 of the smartphone 204 upon a successful password entry. The exemplary configuration screen includes check box menu 470, 472, and 476 (in FIG. 24d) for setting their corresponding switch blocks 270, 272, and 276 (in FIG. 23).

In FIG. 24a, if the user touches the status button 450, a status screen (shown in FIG. 24e) is displayed on the GUI screen 206 of the smartphone 204 which includes useful information such as the current status of the LED driver, the output setting of the LED driver (i.e. the output voltage and current configured for the output of the LED driver), and other useful information such as nameplate information of the finished LED driver.

What is claimed is:

1. An LED driver (10) comprising:
   a. a rectifier (14) adapted to receive an AC line current and to rectify said AC line current into a DC current;
   b. a switching LED driver circuit (20) operatively connected to said rectifier (14) to receive said DC current, said switching LED driver circuit (20) being adapted to produce a DC output and including output leads (26) adapted to be connected to an LED load (28);
   c. a user control means (34) operatively connected to said switching LED driver circuit (20), said user control means (34) providing an interface between an end user of the LED driver (10) and said switching LED driver circuit (20), said interface comprising on/off means for on/off control of said DC output;
   d. a configuration control means (22) comprising means adjustable by an end user of the LED driver (10) adapted to adjust the output voltage and/or output current of said switching LED driver circuit (20) to match various voltage and/or current level requirements of an LED load (28);
   e. said user control means (34) being adapted so that said on/off control and said interface are accessible to an end user of the LED driver (10) during normal operation of the LED driver (10), and said configuration control means (22) comprises means effective to deter accessibility during normal operation of the LED driver (10).

2. The LED driver (10) of claim 1 in the form of an integrated unit sized small enough to fit within an AC outlet box that includes an enclosure, an enclosure faceplate, and a wall cover plate wherein said user control means (34) is adapted for mounting on said enclosure faceplate so as to be exposed to an end user of the LED driver (10) during normal operation of the LED driver (10) and wherein said configuration control means (22) is adapted for mounting so as to deter accessibility during normal operation of the LED driver (10).

3. The LED driver (10) of claim 2 wherein said configuration control means (22) is mounted on the enclosure faceplate so as to be covered by said wall cover plate during normal operation of the LED driver (10).

4. The LED driver (10) of claim 2 wherein said configuration control means is password protected.

5. The LED driver (10) of claim 2 wherein said AC outlet box is an AC outlet gang box and said LED driver (10) includes multiple components of paragraphs a, b, c, and d, sized for positioning in said AC outlet gang box.

6. The LED driver (10) of claim 1 further comprising a remote controller (35) and a remote user control means (34w) located in said remote controller (35), said LED driver (10) further comprising means to wirelessly transmit a signal from said remote user control means (34w) to said switching LED driver circuit (20) for on/off control of said switching LED circuit output.

7. The LED driver of claim 1 further comprising a PWM generator (30) adapted to generate a PWM signal with a duty cycle, means operatively connecting said user control means (34) with said PWM generator (30), said user control means (34) comprising at least one switch for on/off control of said PWM signal, and means operatively connecting said PWM generator (30) with said switching LED driver circuit (20) to provide said switching LED driver circuit (20) with said PWM signal whereby said switching LED driver circuit (20) produces an output controlled by said PWM signal.

8. An LED driver adapted to provide a direct current output to an LED load comprising:
   a. a configuration control means adjustable by an end user of the LED driver adapted to configure said current output to match requirements of said LED load;
   b. a user control means adjustable by said end user of the LED driver adapted to control the current and/or voltage of said current output;
   c. said configuration control means comprising means effective to deter accessibility to said end user during normal operation of the LED driver; and
   d. means making said user control means accessible to an end user of the LED driver during normal operation of the LED driver.

9. The LED driver of claim 8 comprising a remote controller and said user control means being mounted in said remote controller, further including means for wirelessly transmitting a signal from said user control means to said LED driver.

* * * * *